United States Patent
Ohki

(10) Patent No.: US 6,418,281 B1
(45) Date of Patent: Jul. 9, 2002

(54) IMAGE PROCESSING APPARATUS HAVING CALIBRATION FOR IMAGE EXPOSURE OUTPUT

(75) Inventor: Makoto Ohki, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/507,940

(22) Filed: Feb. 22, 2000

(30) Foreign Application Priority Data

Feb. 24, 1999 (JP) ............................................. 11-047200

(51) Int. Cl.[7] .............................................. G03G 15/00
(52) U.S. Cl. ........................... 399/49; 358/519; 358/300
(58) Field of Search ............................... 399/39, 49, 51, 399/72, 15, 11, 52; 358/455, 456, 519, 523, 300

(56) References Cited

U.S. PATENT DOCUMENTS

| 4,710,785 A | * | 12/1987 | Mills ........................... 347/129 |
| 5,347,369 A | * | 9/1994 | Harrington ................... 358/401 |
| 5,461,462 A | * | 10/1995 | Nakane et al. ................ 399/15 |
| 5,510,896 A | * | 4/1996 | Wafler ......................... 358/296 |
| 5,546,165 A | * | 8/1996 | Rushing et al. ............... 399/78 |
| 5,572,330 A | | 11/1996 | Sasanuma .................... 358/298 |
| 5,579,090 A | | 11/1996 | Sasanuma et al. |
| 5,583,644 A | * | 12/1996 | Sasanuma et al. ........... 358/296 |
| 5,697,012 A | | 12/1997 | Sasanuma et al. ............ 399/49 |
| 5,859,933 A | | 1/1999 | Sasanuma et al. .......... 382/275 |
| 5,884,118 A | * | 3/1999 | Mestha et al. ................ 399/15 |
| 5,995,248 A | * | 11/1999 | Katori et al. ............... 358/501 |

* cited by examiner

Primary Examiner—Robert Beatty
(74) Attorney, Agent, or Firm—Fitzpatrick, Cella, Harper & Scinto

(57) ABSTRACT

High precision image density characteristics are stable maintained over extended periods of time. For this purpose, a first calibration operation is preformed in which a predetermined grayscale pattern is formed on a recording paper and this pattern is read by a reading device to produce a LUT for controlling the laser output in accordance with the image signal (gamma correction). A second calibration operation is performed after the first calibration operation wherein a patch is formed on an image carrier by the laser output controlled by the above LUT, its density is detected by a detector and a correction LUT is generated in accordance with the detected density.

33 Claims, 33 Drawing Sheets

SPECTRAL CHARACTERISTICS OF YELLOW TONER

SPECTRAL CHARACTERISTICS OF MAGENTA TONER

SPECTRAL CHARACTERISTICS OF CYAN TONER

SPECTRAL CHARACTERISTICS OF BLACK TONER

IMAGE PROCESSING APPARATUS HAVING CALIBRATION FOR IMAGE EXPOSURE OUTPUT

FIELD OF THE INVENTION

The present invention relates to an image processing apparatus for forming an image on a recording medium and its control method.

BACKGROUND OF THE INVENTION

Conventionally, in order to improve the stability of image quality, an image processing apparatus of this type prints a specific pattern such as a gray scale pattern or the like on a recording medium such as a paper sheet upon completion of a warm-up process upon startup, reads the printed gray scale pattern using an image reader such as a scanner or the like, and feeds back that information to image forming conditions such as γ correction and the like.

However, when the image processing apparatus has been used for a long period of time, the fed-back γ correction characteristics alone often fail to obtain an optimal image.

For example, in an image processing apparatus using electrophotography, even when image forming conditions such as γ correction and the like are optimally adjusted, the attachment characteristics of the toner with respect to the photosensitive drum charge change over long-term use, and consequently optimal image forming conditions cannot be assured.

To solve such problems, a method of making correction using the relationship between the potential data and density has been proposed. However, since the relationship between the potential data and density cannot be determined uniquely, such correction is insufficient. Also, a method of forming a developing patch on, e.g., the surface of a photosensitive drum, converting the output from a photosensor into a density using a density conversion table which is determined in advance, and making γ correction using the converted value is also available. However, since this method detects the density of toner attached onto the surface of the photosensitive drum, the detected density does not always match the final image density. Furthermore, the sensor normally used in this method has insufficient resolution for the attached toner density, and has insufficient performance as an absolute density sensor.

SUMMARY OF THE INVENTION

The present invention has been made in consideration of the conventional problems, and has as its object to provide an image processing apparatus which reads a specific pattern such as a gray scale pattern, and can maintain given image density characteristics by feeding back the read information to image forming conditions such as γ correction and the like, even when the apparatus has been used for a long period of time, and its control method.

In order to achieve the above object, an image processing apparatus according to the present invention, comprises:

forming means for forming a gray scale pattern on an image carrier, and forming a gray scale pattern image by transferring an image corresponding to the gray scale pattern onto a recording sheet;

determination means for reading the gray scale pattern image formed on the recording sheet, and determining density correction characteristics of the forming means;

holding means for holding the density correction characteristics determined by the determination means;

storage means for storing a density of an image formed on the image carrier using the density correction characteristics; and adjustment means for adjusting the density correction characteristics held by the holding means in accordance with a relationship between the density stored in the storage means, and the density of an image formed on the image carrier at a predetermined timing.

Also, an image processing apparatus which forms an electrostatic latent image on an image carrier by an image exposure output corresponding to an image signal, develops the electrostatic latent image with toner, and transfers the developed toner image on the image carrier onto a recording medium, comprises:

pattern forming means for forming a gray scale pattern based on a predetermined image signal on the recording medium;

reading means for reading the gray scale pattern formed by the pattern forming means;

first control means for controlling the image exposure output corresponding to the image signal to match the tone of the image signal with the tone of an image recorded on the recording medium by comparing the gray scale pattern read by the reading means with the predetermined image signal;

storage means for storing a density value of a toner image formed on the image carrier by the image exposure output controlled by the first control means as a reference density value immediately after the control of the first control means;

detection means for detecting a density value of a toner image formed on the image carrier by the image exposure output controlled by the first control means; and second control means for controlling the image exposure output corresponding to the image signal to match the density value detected by the detection means with the reference density value stored in the storage means.

The first control means comprises:

first table generation means for generating a first table for storing a correspondence between the image signal and image exposure output; and table storage means for storing the first table, the second control means comprises:

correction table generation means for generating a correction table for correcting the image signal to match the density value detected by the detection means with the reference density value stored in the storage means; and second table generation means for generating a second table by combining the first table stored in the table storage means with the correction table, and image forming means for forming an image by using the second table.

Detection by the detection means and control by the second control means are automatically done at a predetermined timing.

A method of controlling an image processing apparatus according to the present invention, comprises:

a forming step of forming a gray scale pattern on an image carrier, and forming a gray scale pattern image by transferring an image corresponding to the gray scale pattern onto a recording sheet;

a determination step of reading the gray scale pattern image formed on the recording sheet, and determining density correction characteristics of the forming step;

a holding step of holding the density correction characteristics determined in the determination step;

a storage step of storing a density of an image formed on the image carrier using the density correction characteristics; and an adjustment step of adjusting the density correction characteristics held in the holding step in accordance with a relationship between the density stored in the storage step, and the density of an image formed on the image carrier at a predetermined timing.

An method of controlling an image processing apparatus which forms an electrostatic latent image on an image carrier by an image exposure output corresponding to an image signal, develops the electrostatic latent image with toner, and transfers the developed toner image on the image carrier onto a recording medium, comprises:

a first control step of controlling the image exposure output corresponding to the image signal to match the tone of the image signal with the tone of an image recorded on the recording medium by reading an image on the recording medium on which a predetermined image is recorded by the image processing apparatus;

an storage step of storing a density value of a toner image formed on the image carrier by the image exposure output controlled in the first control step as a reference density value immediately after the first control step;

a detection step of inputting the predetermined image signal at a predetermined timing and detecting a density value of a toner image formed on the image carrier at that time; and a second control step of controlling the image exposure output corresponding to the image signal to match the density value detected in the detection step with the reference density value stored in the storage step.

The first control step comprises:

a first table generation step of generating a first table for storing a correspondence between the image signal and image exposure output; and the table storage step of storing the first table, a second control step comprises:

a correction table generation step of generating a correction table for correcting the image signal to match the density value detected in the detection step with the reference density value stored in the storage step; and a second table generation step of generating a second table by combining the first table stored in the table storage step with the correction table, and a method further comprises the image forming step of forming an image using the second table.

Furthermore, the detection step and the second control step are automatically executed at a predetermined timing.

A computer readable memory according to the present invention is a computer readable memory which stores a control program for an image processing apparatus, which forms an electrostatic latent image on an image carrier by an image exposure output corresponding to an image signal, develops the electrostatic latent image with toner, and transfers the developed toner image on the image carrier onto a recording medium, storing:

a forming program for forming a gray scale pattern on the image carrier, and forming a gray scale pattern image by transferring an image corresponding to the gray scale pattern onto the recording sheet;

a determination program for reading the gray scale pattern image formed on the recording sheet, and determining density correction characteristics of the forming program;

a holding program for holding the density correction characteristics determined by the determination program;

a storage program for storing a density of an image formed on the image carrier using the density correction characteristics; and an adjustment program for adjusting the density correction characteristics held in the holding program in accordance with a relationship between the density stored in the storage program, and the density of an image formed on the image carrier at a predetermined timing.

A computer readable memory which stores a control program for an image processing apparatus, which forms an electrostatic latent image on an image carrier by an image exposure output corresponding to an image signal, develops the electrostatic latent image with toner, and transfers the developed toner image on the image carrier onto a recording medium, has:

a first control program for controlling the image exposure output corresponding to the image signal to match the tone of the image signal with the tone of an image recorded on the recording medium by reading an image on the recording medium on which a predetermined image is recorded by the image processing apparatus;

a storage program for storing a density value of a toner image formed on the image carrier by the image exposure output controlled by the first control program as a reference density value immediately after execution of the first control program;

a detection program for inputting the predetermined image signal at a predetermined timing and detecting a density value of a toner image formed on the image carrier at that time; and a second control program for controlling the image exposure output corresponding to the image signal to match the density value detected by the detection program with the reference density value stored in the storage program.

The first control program includes:

a first table generation program for generating a first table for storing the correspondence between the image signal and image exposure output; and a table storage program for storing the first table, the second control program includes:

a correction table generation program for generating a correction table for correcting the image signal to match the density value detected by the detection program with the reference density value stored in the storage program; and a second table generation program for generating a second table by combining the first table stored in the table storage program with the correction table.

The detection program and the second control program are automatically executed at a predetermined timing.

An image processing apparatus comprising:

first calibrating means for calibration an image forming apparatus based on an image fixed on a recording medium and generating a look-up table for correcting image data; and second calibrating means for calibrating the image forming apparatus based on an image formed on an image holding medium and generating data for correcting the look-up table.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will be explained in detail hereinafter with reference to the accompanying drawings. Note that the relative layouts of building elements, formulas, numerical values, and the like described in the embodiments of the present invention do not limit the scope of the present invention in any way unless otherwise specified.

[First Embodiment]

An embodiment of the present invention will be described in detail below with reference to the accompanying drawings.

Figure 1:
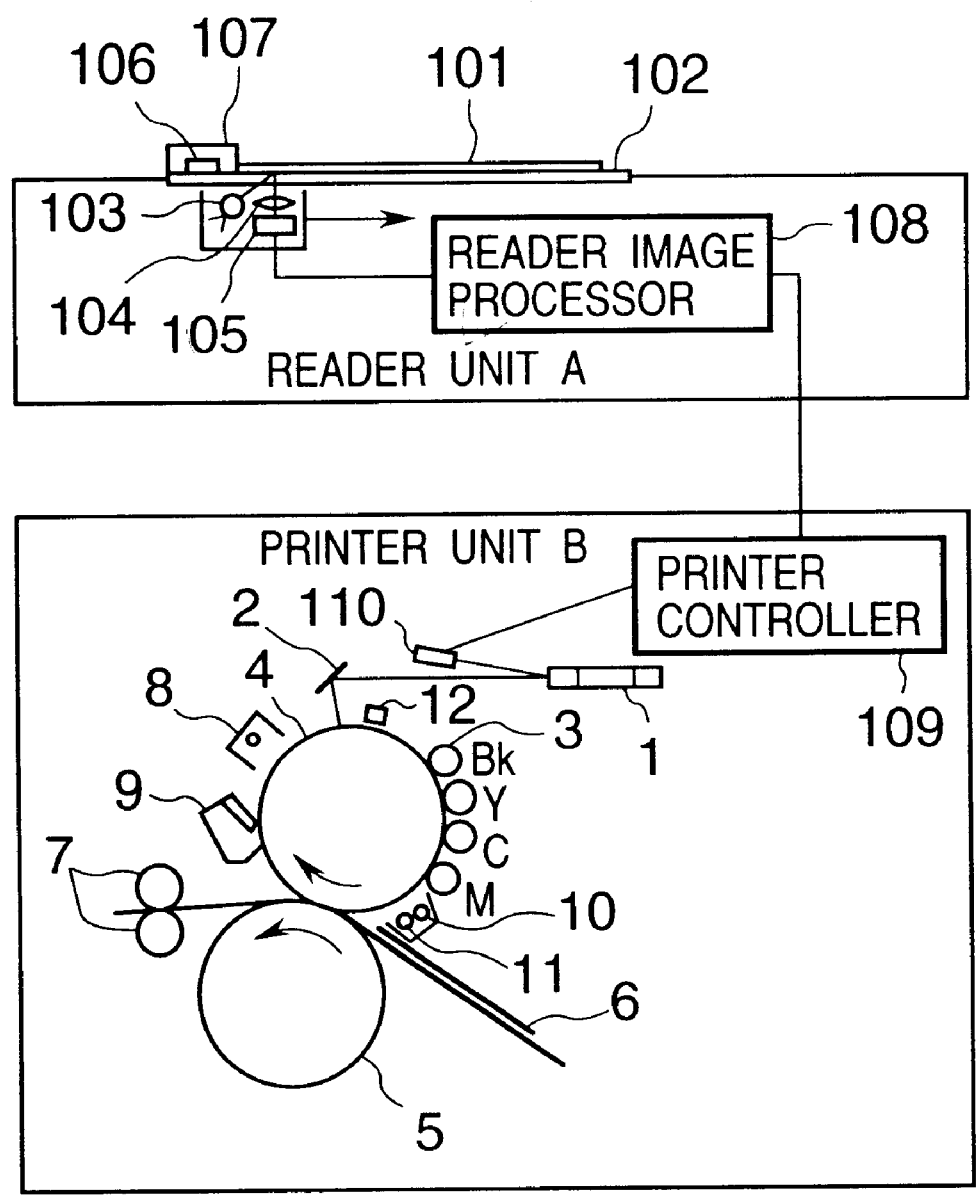
FIG. 1 is a schematic view showing of an image processing apparatus according to the first embodiment of the present invention.

FIG. 1 is a schematic view showing a full-color image processing apparatus of this embodiment.

An original 101 placed on a platen glass 102 is irradiated with light emitted by a light source 103, and light reflected by the original 101 forms an image on a CCD sensor 105 via an optical system 104. The CCD sensor 105 generates red, green, and blue color component signals in units of line sensors using red, green, and blue line sensors, which line up in three arrays.

A reading optical system unit including these components scans in the direction of the arrow in FIG. 1 to convert the original into an electrical signal data sequence in units of lines.

On the platen glass 102, a reference white plate 106 and a registration member 107 are placed. The reference white plate 106 is used for determining the white level of the CCD sensor 105 and for performing the shading correction in the scan direction. The registration member 107 register the original to prevent it from being obliquely placed.

Image signals obtained by the CCD sensor 105 undergo an image process by a reader image processor 108, and the processed signals are sent to a printer portion B to undergo further image processing by a printer controller 109.

The image processor 108 will be described below.

Figure 2:
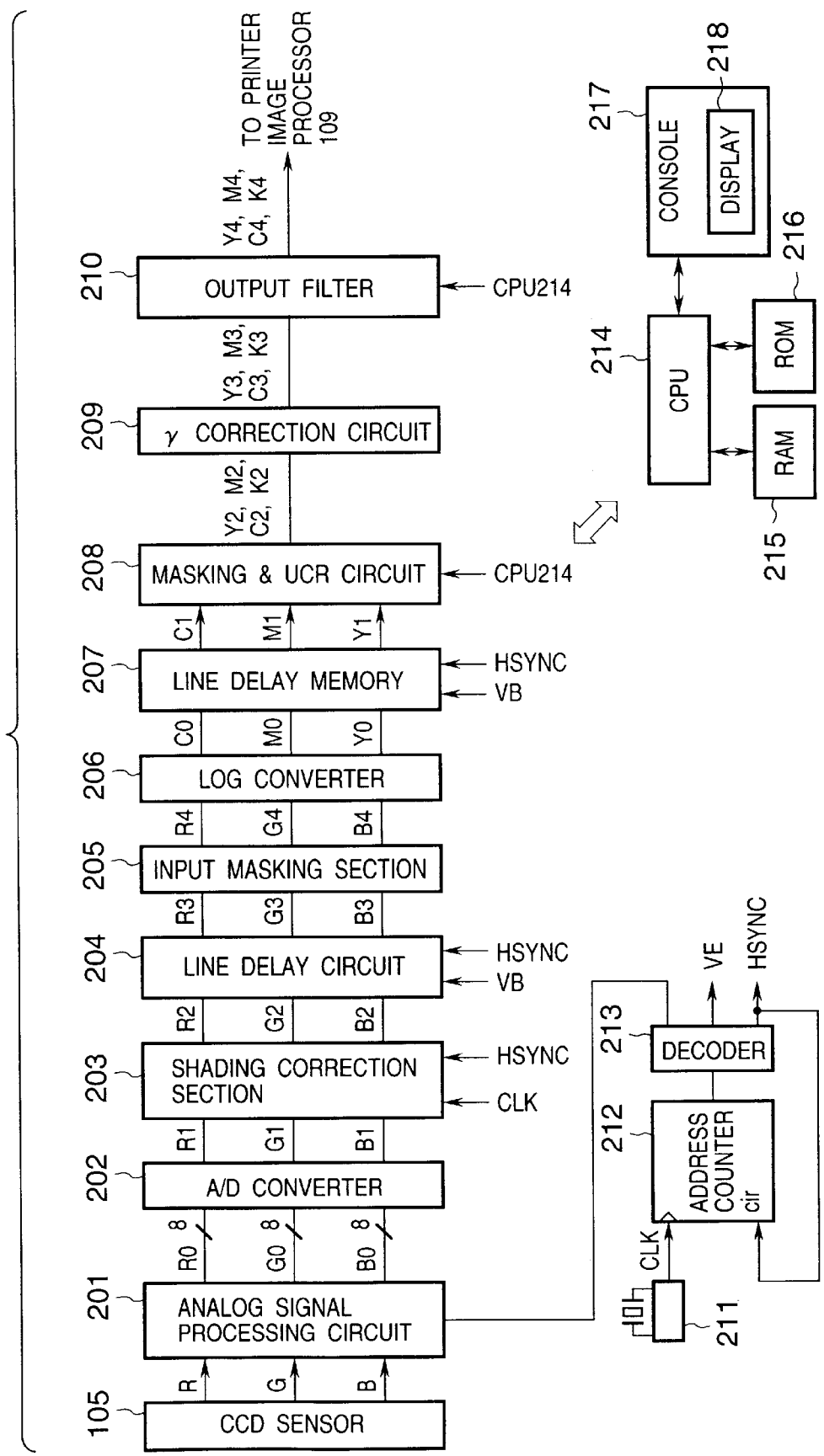
FIG. 2 is a block diagram showing a reader image processor 108 of the image processing apparatus according to the first embodiment.

FIG. 2 is a block diagram showing the flow of image signals in the image processor 108 of a reader portion A according to this embodiment. As shown in FIG. 2, image signals output from the CCD sensor 105 are input to an analog signal processor 201 to undergo gain and offset adjustments. An A/D converter 202 into 8-bit digital image signals R1, G1, and B1 then converts the adjusted signals. Subsequently, these signals are input to a shading correction section 203 and undergo known shading correction using signals obtained by reading the reference white plate 106 in units of colors.

A clock generator 211 generates clocks in units of pixels. A main scan address counter 212 counts clock pulses from the clock generator 211 and generates a pixel address output for one line. A decoder 213 decodes the main scan address from the main scan address counter 212 and generates CCD drive signals in units of lines such as shift pulses, reset pulses, and the like, a VE signal indicating an effective region in a 1-line read signal from the CCD, and a line sync signal HSYNC. Note that the main scan address counter 212 is cleared in response to the signal HSYNC to start counting of the main scan address for the next line.

Since the line sensors of the CCD sensor 105 are spaced predetermined distances from each other, spatial deviations in the sub-scan direction are corrected by a line delay circuit 204 in FIG. 2.

More specifically, the R and G signals are line-delayed with respect to the B signal in the sub-scan direction to be adjusted to the B signal.

An input masking section 205 converts a read color space determined by the spectral characteristics of R, G, and B filters of the CCD sensor into an NTSC standard color space, and makes a matrix operation given by:

$$\begin{bmatrix} R4 \\ G4 \\ B4 \end{bmatrix} = \begin{bmatrix} a11 & a12 & a13 \\ a21 & a22 & a23 \\ a31 & a32 & a33 \end{bmatrix} \begin{bmatrix} R3 \\ G3 \\ B3 \end{bmatrix} \quad (1)$$

A light amount/density converter (LOG converter) 206 comprises a look-up table ROM, and converts luminance signals R4, G4, and B4 into density signals C0, M0, and Y0. A line delay memory 207 delays the image signals C0, M0, and Y0 by a line delay amount up to determination signals UCR, FILTER, SEN, and the like generated by a black character determination section (not shown) from the signals R4, G4, and B4.

A masking & UCR circuit 208 extracts a black signal (Bk) from input three primary color signals Y1, M1, and C1, makes an operation for correcting chromatic blur of recording color agents in the printer portion B, and outputs signals Y2, M2, C2 and Bk2 with a predetermined bit width (8 bits) for each read operation.

A γ correction circuit 209 makes density correction to attain ideal tone characteristics of the printer portion B in the reader portion A. On the other hand, a spatial filter processor (output filter) 210 makes an edge emphasis or smoothing process.

The processed, frame-sequential image signals M4, C4, Y4, and Bk4 are sent to the printer controller 109, and undergo density recording by means of PWM in the printer portion B.

Reference numeral 214 denotes a CPU for controlling components inside the reader portion; 215, a RAM; and 216, a ROM. Reference numeral 217 denotes a console (control panel) having a display 218.

Figure 3:
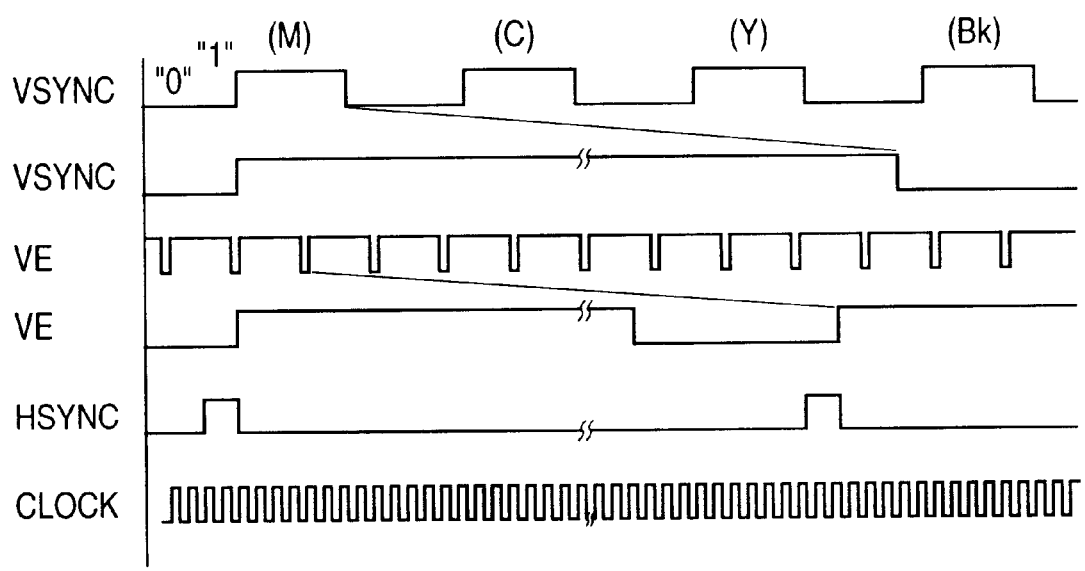
FIG. 3 is a timing chart showing the timings of the reader image processor 108 of the image processing apparatus according to the first embodiment.

FIG. 3 shows the timings of respective control signals in the image processor 108 shown in FIG. 2. Referring to FIG. 3, the signal VSYNC is an image effective period signal in the sub-scan direction, and an image is read (scanned) to form output signals (C), (M), (Y), and (Bk) in turn during periods in which the signal VSYNC is at logic "1". The signal VE is an image effective period signal in the main scan direction, defines the timings of main scan start positions during periods in which it is at logic "1", and is mainly used in line count control for line delay. The signal CLOCK is a pixel sync signal, and is used to transfer image data at the timing of its "0"→"1" leading edge.

Referring back to FIG. 1, the printer portion B will be explained below.

Referring to FIG. 1, a photosensitive drum 4 is uniformly charged by a primary charger 8.

Image data is converted into a laser beam signal via a laser driver included in the printer controller 109 and a laser beam source 110, and the laser beam signal is reflected by a polygonal mirror 1 and mirror 2. The uniformly charged surface of the photosensitive drum 4 is then irradiated with that laser beam signal.

The photosensitive drum 4 on which a latent image is formed by scanning the laser beam signal rotates in the direction of an arrow shown in FIG. 1.

Then, developers 3 develop images in turn in units of colors.

This embodiment uses a two-component system as a developing method, and the color developers 3 are disposed around the photosensitive drum 4 in turn in the order of black (Bk), yellow (Y), cyan (C), and magenta (M) from the upstream side. The developer corresponding to an image signal develops at the developing timing of a latent image region formed on the photosensitive drum.

A transfer sheet 6 is wound around the transfer drum 5, which makes one revolution in the order of M, C, Y, and Bk for a total of four revolutions, thus transferring color toner images onto the transfer sheet 6 to overlap each other.

Upon completion of transfer, the transfer sheet 6 is peeled from the transfer drum 5, and the toner image formed on the sheet 6 is fixed by a pair of fixing rollers 7, thus completing a full-color image print.

A surface potential sensor 12 is located on the upstream side of the developers 3 around the photosensitive drum 4.

The printer portion B also includes a cleaner 9 for cleaning the residual toner on the photosensitive drum 4 upon transfer, and an LED light source 10 (having a main wavelength of around 960 nm) and photodiode 11, which are used to detect the amount of light reflected by a toner patch pattern formed on the photosensitive drum 4.

Figure 4:
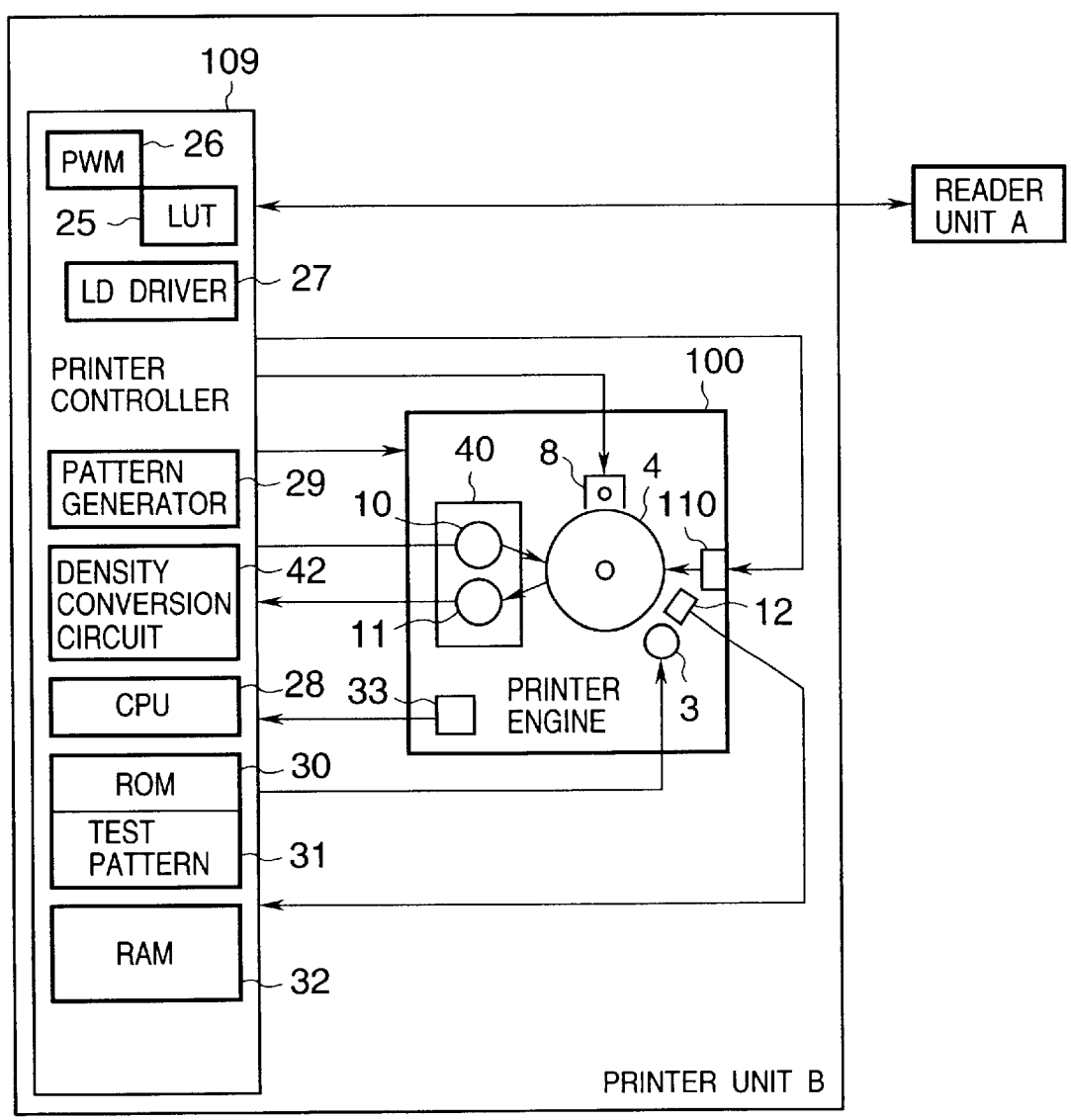
FIG. 4 is a control block diagram of the image processing apparatus according to the first embodiment.

FIG. 4 is a block diagram showing the arrangement of the image processing apparatus according to this embodiment.

The printer controller 109 is constructed by a CPU 28, ROM 30, RAM 32, test pattern memory 31, density conversion circuit 42, and LUT 25, and can communicate with the reader portion A and a printer engine 100.

The printer controller 109 controls an optical reading device (photosensor) 40, which includes the LED 10 and photodiode 11, the primary charger 8, the laser beam source 110, the surface potential sensor 12, and the developers 3, which are arranged around the photosensitive drum 4.

The printer engine 100 includes an environment sensor 33, which measures humidity of the air in the apparatus.

The surface potential sensor 12 is located on the upstream side of the developers 3, and controls the grid potential of the primary charger 8 and the developing bias of the developers 3, as will be described later.

Figure 5:
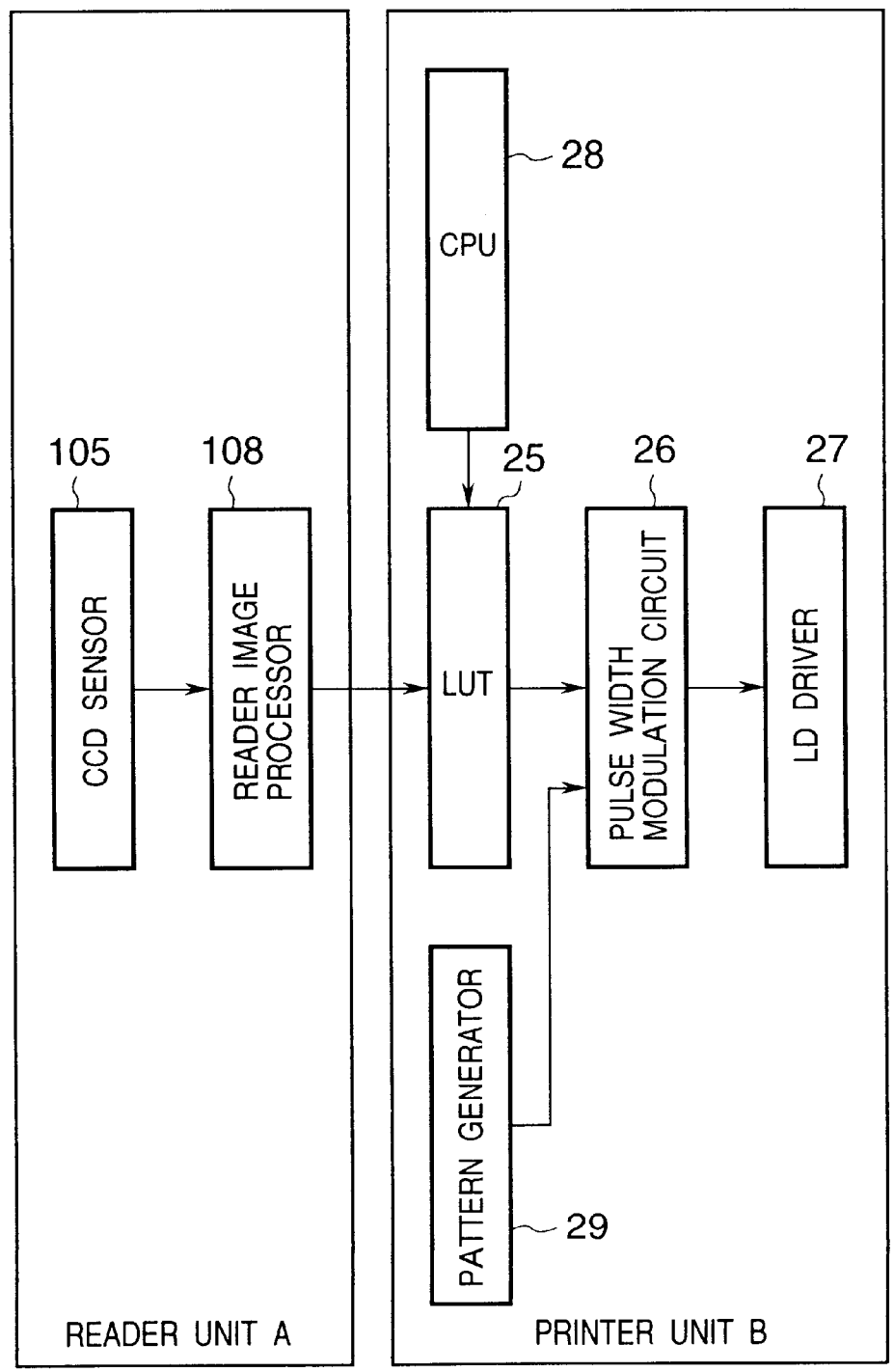
FIG. 5 is a block diagram showing the image processing apparatus according to the first embodiment.

FIG. 5 shows an image signal processing circuit for obtaining a halftone image according to this embodiment.

A luminance signal of an image is obtained by the CCD sensor 105, and is converted into a frame-sequential image signal by the reader image processor 108. The density characteristics of this image signal are converted by the LUT 25 to match with the default γ characteristics of the printer, i.e., so that the density of an original image expressed by the input image matches that of an output image.

Figure 6:
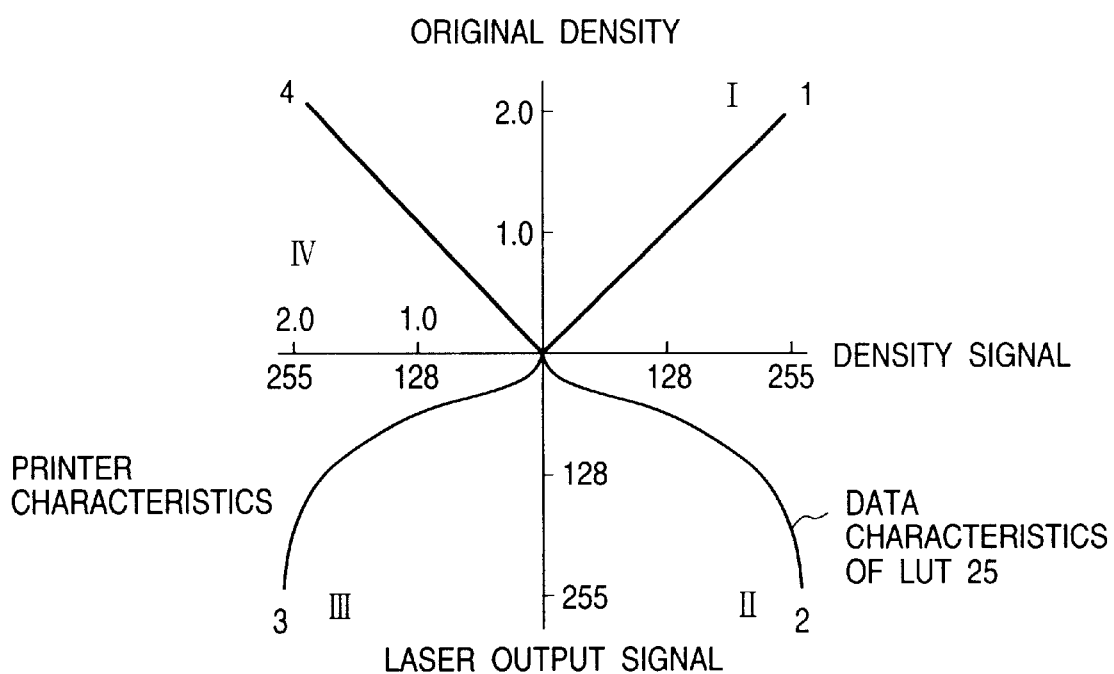
FIG. 6 is a four-quadrant chart showing tone reproduction characteristics.

FIG. 6 is a four-quadrant chart showing tone reproduction.

Quadrant I shows the reading characteristics of the reader portion A that converts an original density into a density signal; quadrant II shows the conversion characteristics of the LUT 25 for converting the density signal into a laser output signal; quadrant III shows the recording characteristics of the printer portion B for converting the laser output signal into an output density; and quadrant IV shows the total tone reproduction characteristics of this image processing apparatus, which represent the relationship between the original density and output density. The number of gray levels is 256 since the process is done using 8-bit digital signals.

In this image processing apparatus, in order to obtain linear tone characteristics in quadrant IV, nonlinear components of the printer characteristics in quadrant III are corrected by the LUT 25 in quadrant II.

Such LUT 25 is generated by the result of arithmetic operations to be described later.

Referring back to FIG. 5, the signal converted by the LUT 25 is converted into the signal corresponding to a dot width by a pulse width modulation (PWM) circuit 26, and the converted signal is sent to the laser driver 27 for controlling the turn on/off of the laser beam.

In this embodiment, tone reproduction based on pulse width modulation is used for all the Y, M, C, and K colors.

By scanning the laser beam source 110, a latent image having predetermined tone characteristics is formed on the surface of the photosensitive drum 4, and a halftone image is reproduced via development, transfer, and fixing processes.

(Tone Control of System Including Both Reader/Printer)

A first control system that pertains to stabilization of the image reproduction characteristics of a system that includes both the reader portion A and printer portion B will be explained below.

Calibration of the printer portion B using the reader portion A will be explained below with reference to the flow chart shown in FIG. 7. This flow is implemented by the CPU 214 that controls the reader portion A, and the CPU 28 that controls the printer portion B.

Upon pressing a mode setting button named "automatic tone correction" and provided on the console 217, this control starts. In this embodiment, the display 218 comprises a liquid crystal display panel with a pressure sensor (touch panel display) shown in FIGS. 8 to 10, and the operator can directly make operations on the display 218.

This calibration control will be described below in units of steps in FIG. 7.

{Output Test Print 1: Step S51}

Figure 8A:
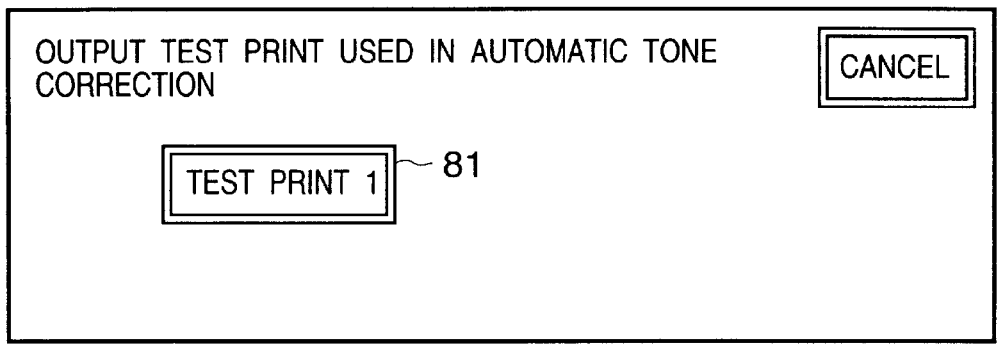
FIGS. 8A to 8C show the display contents of a display 218 of the image processing apparatus according to the first embodiment.

In step S51, a print start button 81 for test print 1 appears on the display 218 (FIG. 8A). When the operator presses this button, the printer portion B prints out an image of test print 1 shown in FIG. 11.

Figure 8B:
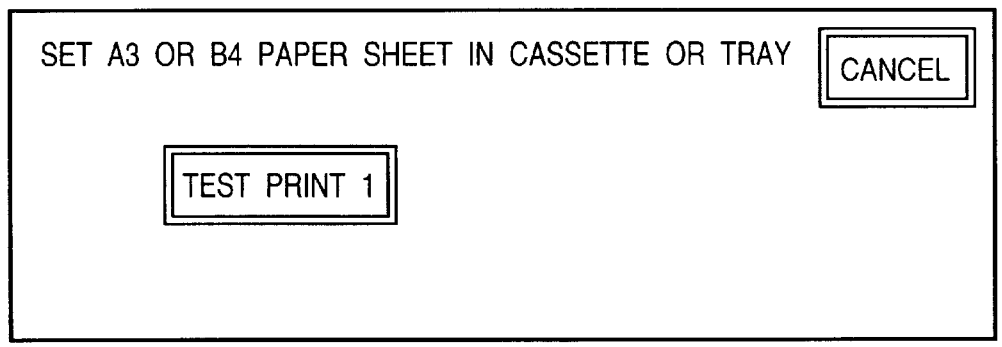
Figure 8C:
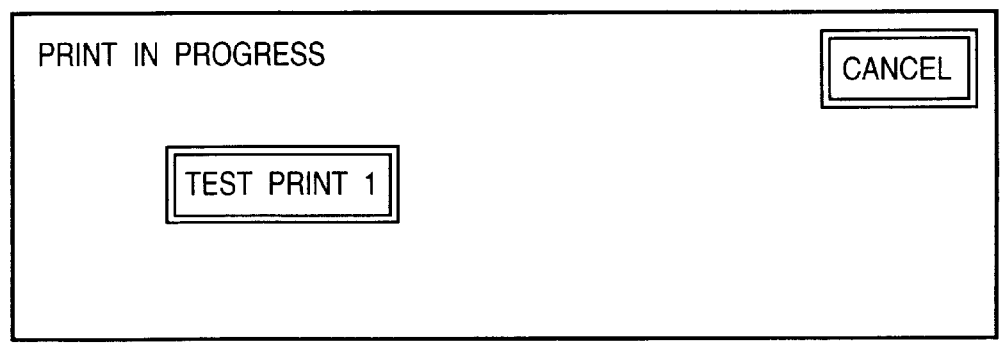

At this time, the CPU 214 checks the presence/absence of a paper sheet used to form test print 1. If no paper sheet is available, an alert display shown in FIG. 8B is made.

A standard contrast potential corresponding to an environment is registered as a default value, and this default value is used upon forming test print 1.

The apparatus of this embodiment comprises a plurality of paper cassettes, and a plurality of different paper sizes such as B4, A3, A4, B5, and the like are selectable.

However, this control is set to use so-called large-size paper sheets, i.e., B4, A3, 11×17, or LGR sheets to avoid errors resulting from wrong document (portrait, landscape) positions.

Figure 11:
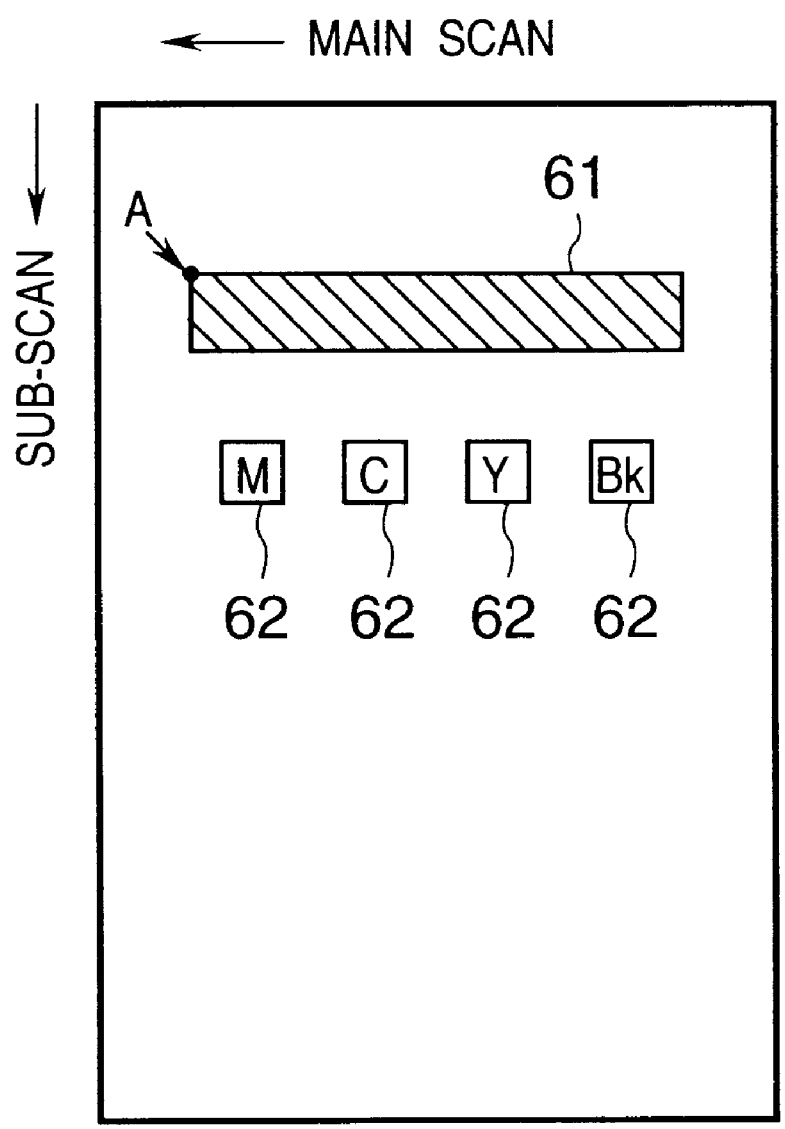
FIG. 11 shows an example of test print 1 of the image processing apparatus according to the first embodiment.

As shown in FIG. 11, a stripe pattern 61 by halftone densities of four colors Y, M, C, and K is formed as test pattern 1.

The operator visually inspects this pattern 61 to confirm if it is free from any stripe-shaped abnormal image, density non-uniformity, and color non-uniformity. The main scan size of this pattern 61 is set to cover patch patterns 62 and gray scale patterns 71 and 72 for test print 2 (to be described later).

If any abnormality is found, test print 1 is printed again, and if abnormality is found again, a message that says "call a service person" is displayed.

Note that this pattern 61 may be read by the reader portion A, and whether or not to proceed with the subsequent control may be automatically determined based on density information of that pattern in the scan direction.

The patterns 62 are maximum density patches of colors Y, M, C, and Bk. That is, the density signal value is set at 255.

{Read Test Print 1: Step S52}

Figure 9A:
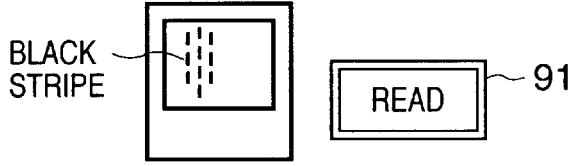
FIGS. 9A to 9C show the display contents of the display 218 of the image processing apparatus according to the first embodiment.
Figure 13:
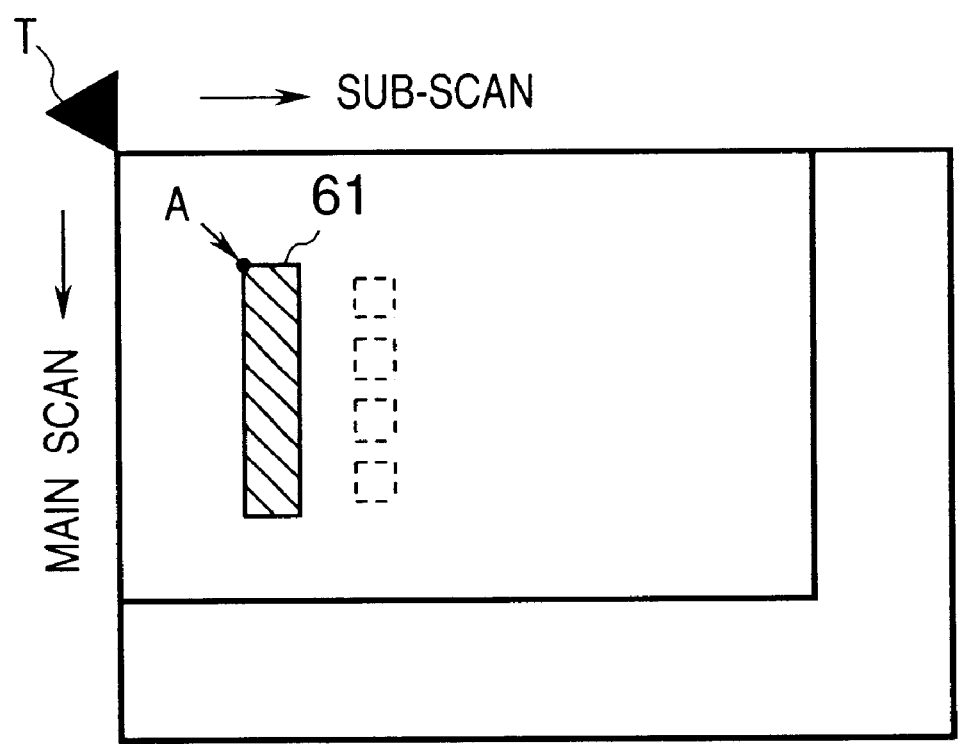
FIG. 13 shows the layout of test print 1 placed on a platen.

In step S52, the operator places this image of test print 1 on the platen glass 102, as shown in FIG. 13, and presses a read start button 91 shown in FIG. 9A.

At this time, a guidance message for the operator shown in FIG. 9A appears.

FIG. 13 is a top view of the platen. An upper left wedge-shaped mark T is an original registration mark of the platen, and the aforementioned message (FIG. 9A) is displayed on the control panel to locate the pattern 61 on the side of the registration mark T and to prevent the wrong side not bearing information from facing down. In this manner, control errors resulting from wrong document positions can be prevented.

Upon reading the patterns 62 by the reader portion A, a scan gradually starts from the registration mark T, and a first density gap point A is determined to be the corner of the pattern 61. The relative coordinate positions of the patch patterns 62 are determined from the coordinate point of the point A, thus reading the density values of the patterns 62.

Figure 9B:
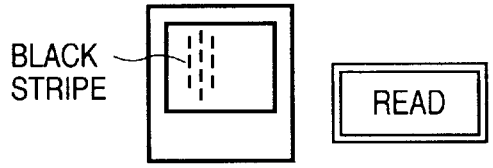
Figure 9C:
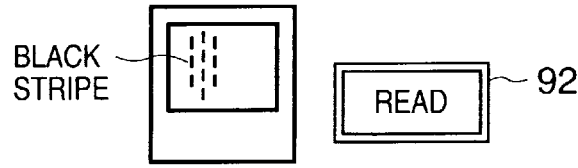

During reading, a message shown in FIG. 9B is displayed. On the other hand, when test print 1 is set in a wrong direction or at a wrong position, and cannot be read, a message shown in FIG. 9C is displayed. When the operator re-places the sheet and presses the read key 92, test pattern 1 is read again.

The read R, G, and B values are converted into optical densities by:

$$\left.\begin{array}{l} M = -k_m \times \log 10(G255) \\ C = -k_c \times \log 10(R255) \\ Y = -k_y \times \log 10(B255) \\ Bk = -k_{bk} \times \log 10(G255) \end{array}\right\} \quad (2)$$

To obtain the same values as those obtained by a commercially available densitometer, the values are adjusted using correction coefficients $k_m$, $k_c$, $k_y$, and $k_{bk}$.

Also, another LUT may be used to convert RGB luminance information into MCYBk density information.

{Compute Contrast Potential: Step S53}

A method of correcting the maximum density based on the obtained density information will be explained below.

Figure 15:
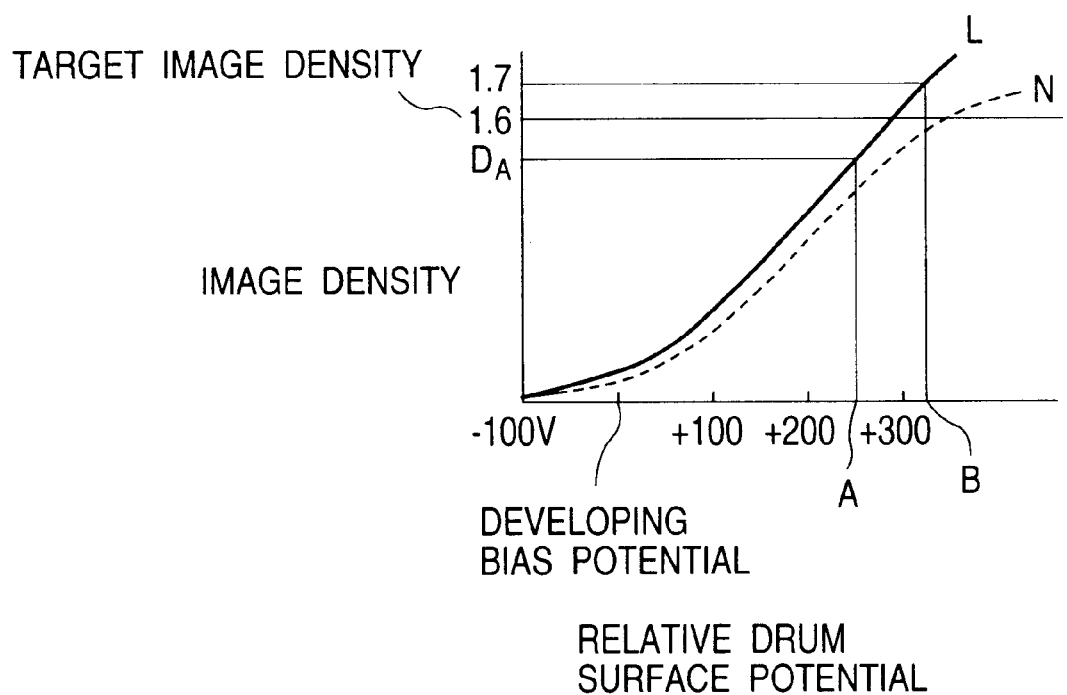
FIG. 15 is a graph showing the relationship between the relative drum surface potential and image density.

FIG. 15 shows the relationship between the relative drum surface potential and the image density obtained by the aforementioned arithmetic operations.

A contrast potential is defined as the difference between the developing bias potential and the surface potential of the photosensitive drum upon irradiating a laser beam signal corresponding to a maximum level of image data after the primary charger charges the drum surface.

Assume that when the contrast potential is set for value A, the obtained maximum density is $D_A$. In a density range around maximum density $D_A$, the image density linearly normally corresponds to the relative drum surface potential, as indicated by solid curve L.

In the two-component developing system, the toner density in the developer may often vary and become low. That is, in the density range around the maximum density, non-linear characteristics may be obtained, as indicated by broken curve N.

Hence, when the target value of the final maximum density is 1.6, the controlled variable is determined by setting the target value to be 1.7 in consideration of a margin of 0.1.

Contrast potential B for obtaining the maximum image density value=1.7 is given by;

$$B = (A+Ka) \times 1.7/(D_A) \qquad (3)$$

where Ka is a correction coefficient, whose value is preferably optimized depending on the type of developing method.

The contrast potential must be frequently changed in correspondence with the environment.

Figure 16:
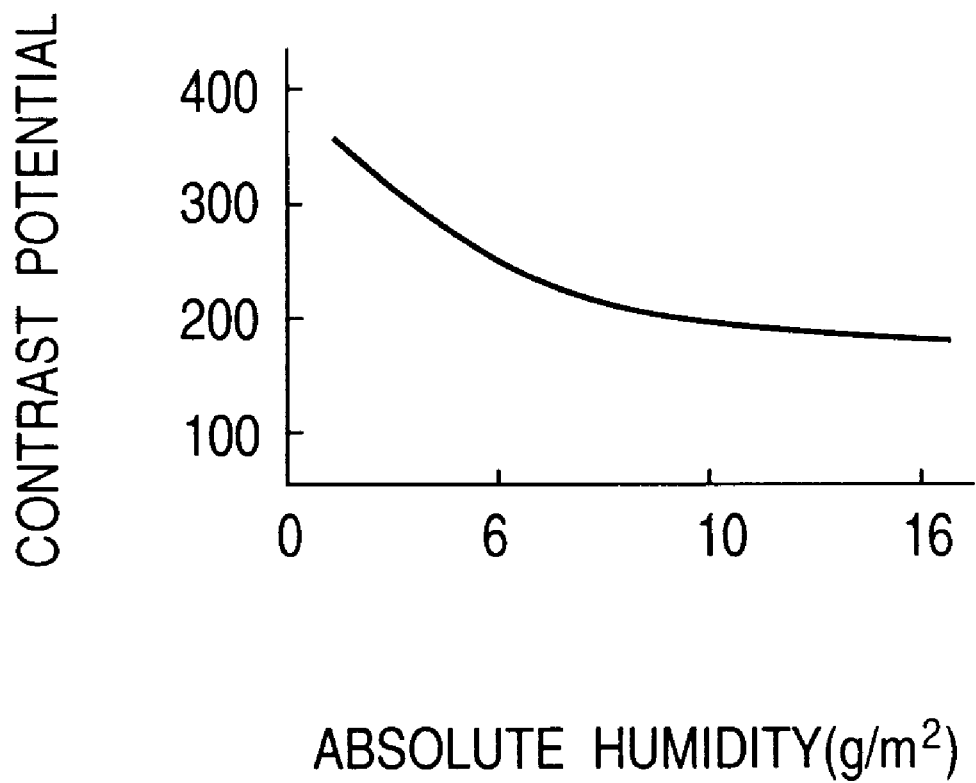
FIG. 16 is a graph showing the relationship between the absolute humidity and contrast potential.

Therefore, a correction coefficient Vcont.rate (=B/A) is saved in a backed-up RAM. Then a change in environment (humidity) is detected at 30 min intervals on the basis of the output from the aforementioned environment sensor 33 that monitors the humidity in the apparatus. By using the relation shown in FIG. 16, the value A is determined based on the detection result, and A×Vcont.rate is calculated to obtain contrast potential B.

A method of obtaining the grid potential and developing bias potential from the contrast potential will be briefly explained below.

Figure 17:
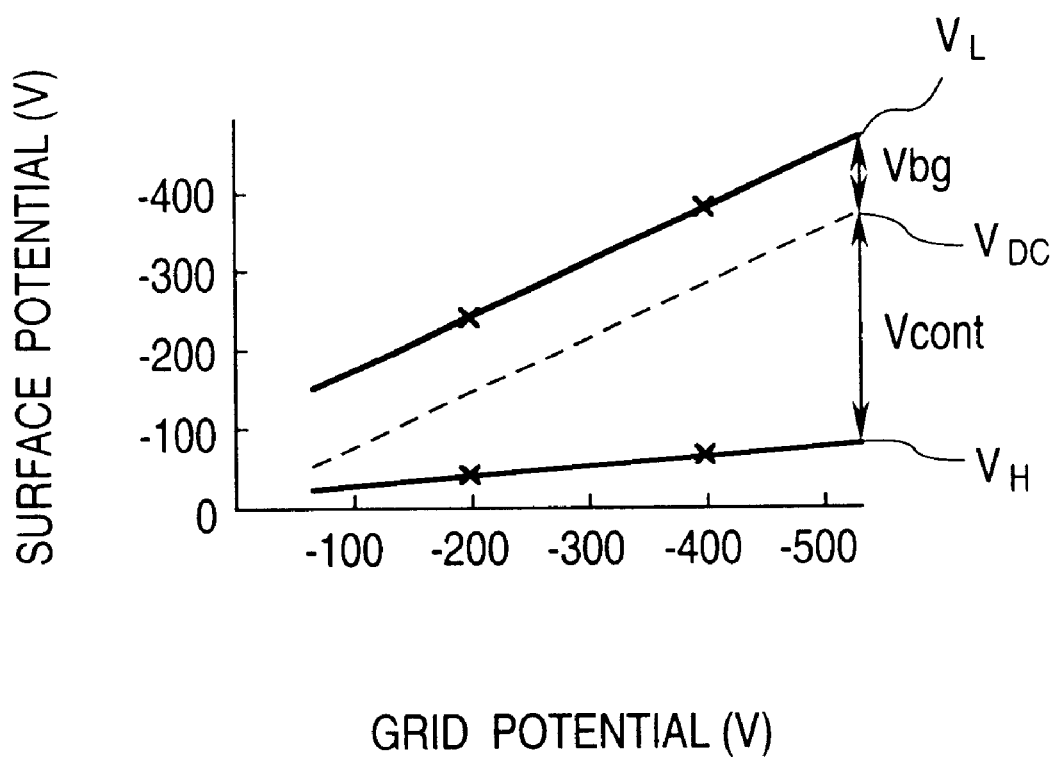
FIG. 17 is a graph showing the relationship between the grid potential and surface potential.

FIG. 17 shows the relationship between the grid potential and the surface potential of the photosensitive drum.

Surface potential $V_L$ when the laser beam is set at the lowest level, and surface potential $V_H$ when the laser beam is set at the highest level while the grid potential is set at −200 V are measured by a surface potential sensor 12.

Likewise, $V_L$ and $V_H$ when the grid potential is set at −400 V are measured.

The relationship between the grid potential and surface potential can be obtained by interpolation and extrapolation of those data for −200 V and −400 V.

The control for obtaining the potential data is called potential measurement control.

Developing bias $V_{DC}$ is set by subtracting $V_{bg}$ (set at 100 V in this case) from $V_L$, for avoiding toner from becoming attached to an image.

Contrast potential Vcont is the differential voltage between developing bias $V_{DC}$ and $V_H$, and the maximum density increases with increasing Vcont, as described above.

The grid potential and developing bias potential (V) required for setting contrast potential B given by equation (3) can be computed based on the relationship shown in FIG. 17.

Figure 7:
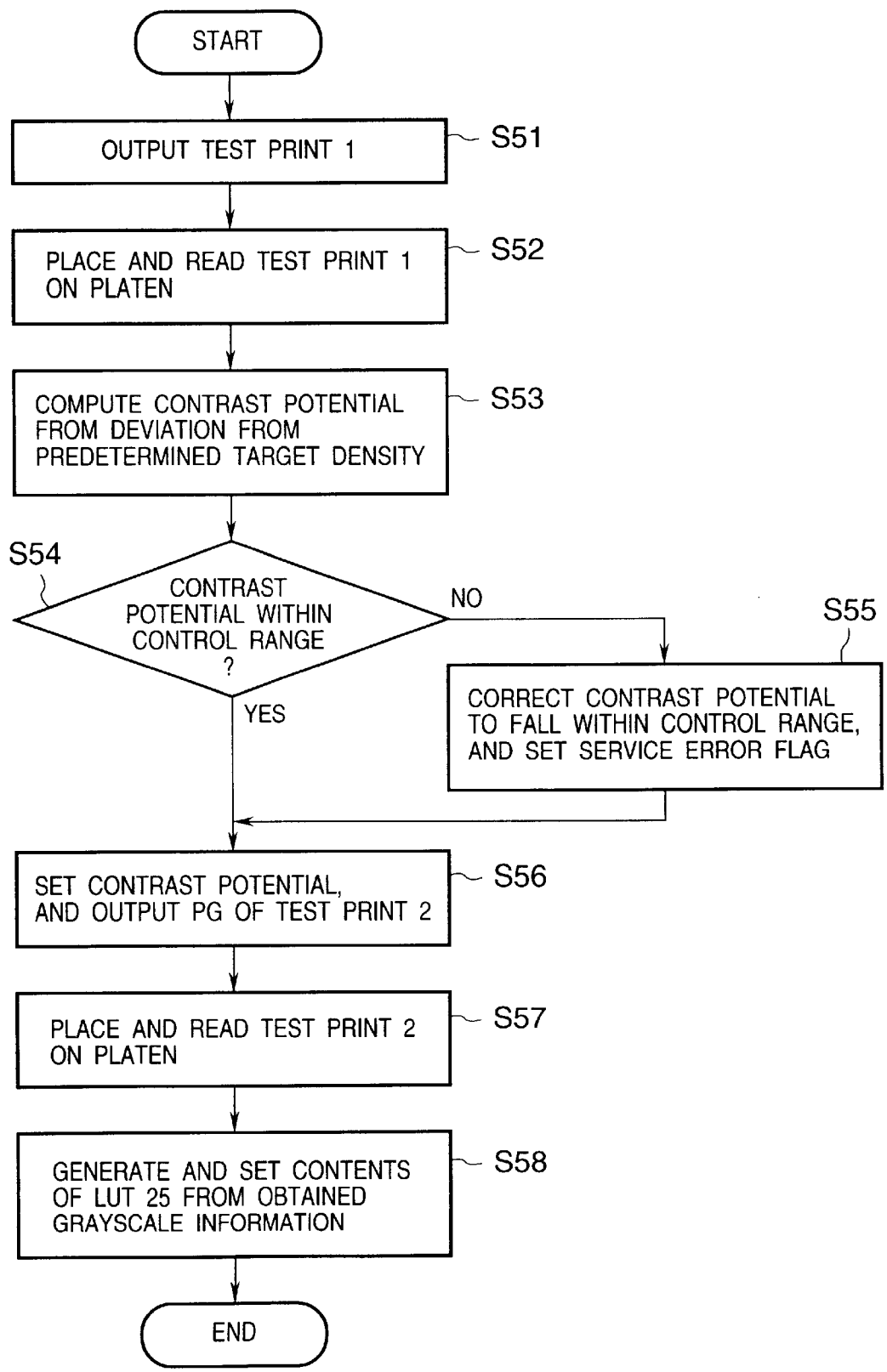
FIG. 7 is a flow chart of a first control system of the image processing apparatus according to the first embodiment.

In step S53 in FIG. 7, the contrast potential is computed so that the maximum density is set 0.1 higher than the final target value, and the grid potential and developing bias potential are set to obtain the computed contrast potential.
{Compare Contrast Potential: Step S54}

It is checked in step S54 if the computed contrast potential falls within a control range. If the computed contrast potential deviates from the control range, it is determined that the developer or the like is abnormal, and an error flag is set to indicate the corresponding color developer to be checked so that a service person can check it in a predetermined service mode.
{Correct Contrast Potential: Step S55}

In step S55, contrast potential B is corrected to a limit value of the control range to proceed with the control.

In this manner, the CPU 28 sets the grid potential and bias potential to obtain contrast potential B computed in step S53.

Figure 20:
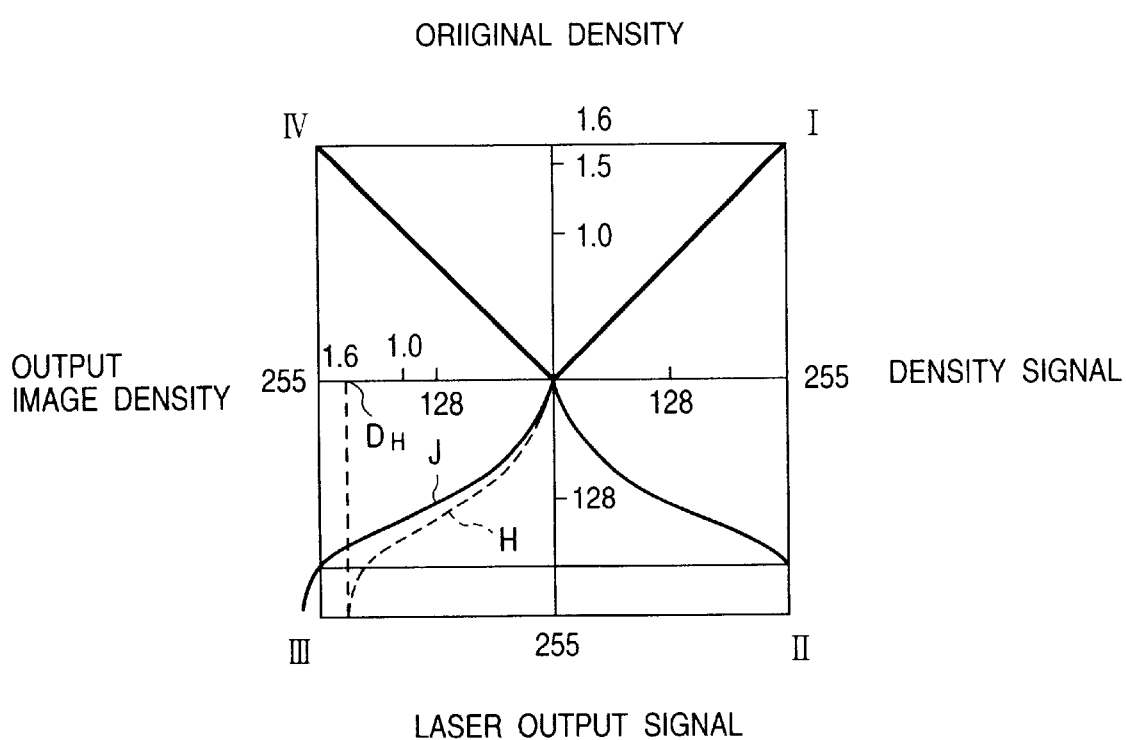
FIG. 20 is a graph showing the density conversion characteristics.

FIG. 20 shows the density conversion characteristics. With the maximum density control of this embodiment, which sets the maximum density to be higher than the final target value, the printer characteristics in quadrant III are converted, as indicated by solid curve J.

If such control is not done, printer characteristics that cannot reach 1.6, as indicated by broken curve H, may be set. In case of the characteristics indicated by broken curve H, since the LUT 25 does not have correction for increasing the maximum density independently of its setups, it is impossible to reproduce density between density $D_H$ and the maximum density value=1.6.

When a target value is slightly higher than the set maximum density, as indicated by solid curve J, the density reproduction range can be reliably assured by the total tone characteristics in quadrant IV.
(Test Print 2)
{Output Test Print 2: Step S56}

Figure 10A:
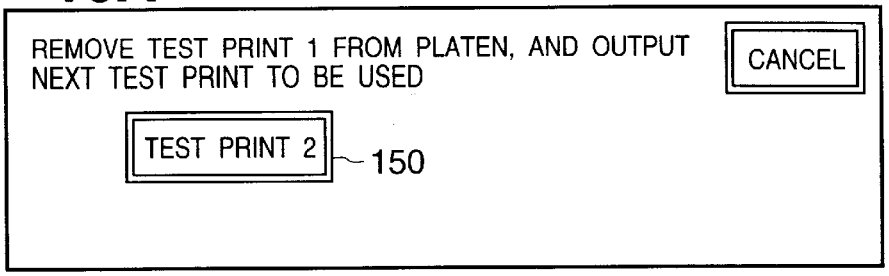
FIGS. 10A to 10E show the display contents of the display 218 of the image processing apparatus according to the first embodiment.
Figure 10B:
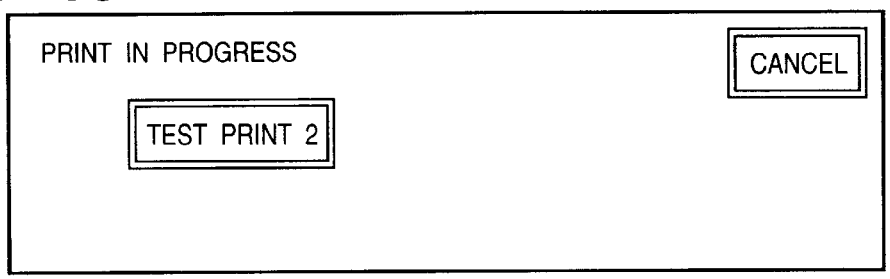
Figure 10C:
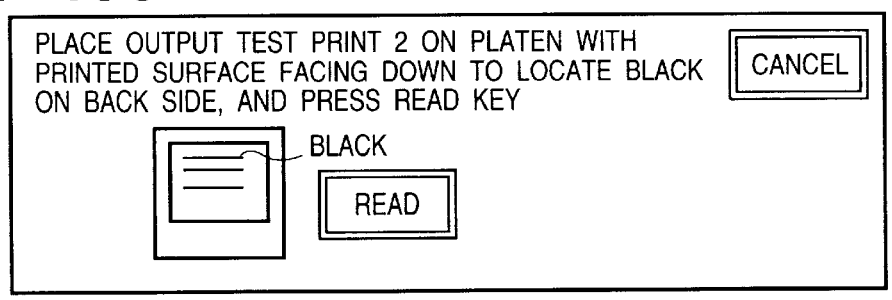
Figure 12:
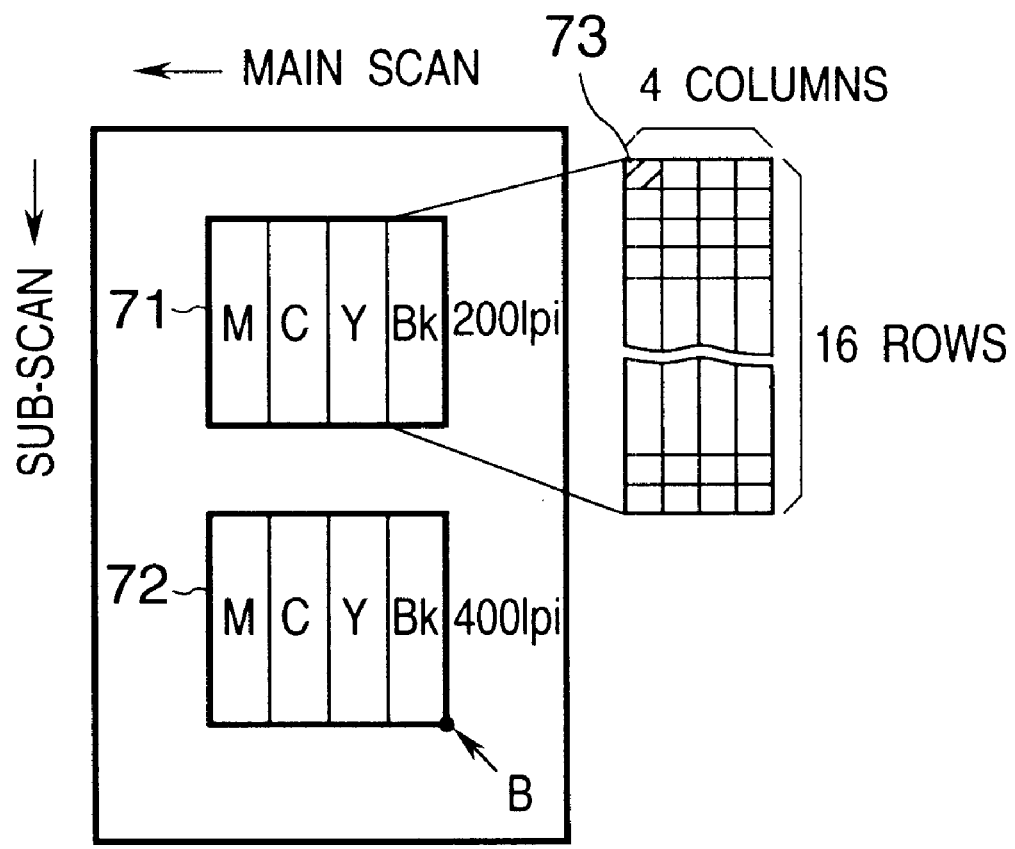
FIG. 12 shows an example of test print 2 of the image processing apparatus according to the first embodiment.

Subsequently, a print start button 150 of an image of test print 2 appears on the control panel, as shown in FIG. 10A. When the operator presses this button, an image of test print 2 shown in FIG. 12 is printed out (S56). During the print process, a message shown in FIG. 10B is displayed.

Test print 2 consists of 4 (columns)×16 (rows) gradation patches for a total of 64 gray levels, which are selected from 256 gray levels by assigning more laser output levels to a lower density range than to a higher density range. In this manner, the tone characteristics of, especially, a highlight portion can be satisfactorily adjusted.

Referring to FIG. 12, reference numeral 71 denotes a patch at a resolution of 200 lpi (lines/inch); and 72, a patch at a resolution of 400 lpi (lines per inch). Images of these resolutions can be formed by preparing a plurality of different periods of triangular waves, which are used in comparison with image data to be processed in the PWM circuit 26.

Note that the image processing apparatus of this embodiment forms a halftone image at a resolution of 200 lpi, and a line image such as a character or the like at a resolution of 400 lpi. Patterns at identical gray levels are output at these two different resolutions. When the tone characteristics vary considerably due to the resolution difference, different gray levels are preferably set in correspondence with the resolutions.

Also, test print 2 is generated by a pattern generator 29 without operating the LUT 25.
{Read Test Print 2: Step S57}

Figure 14:
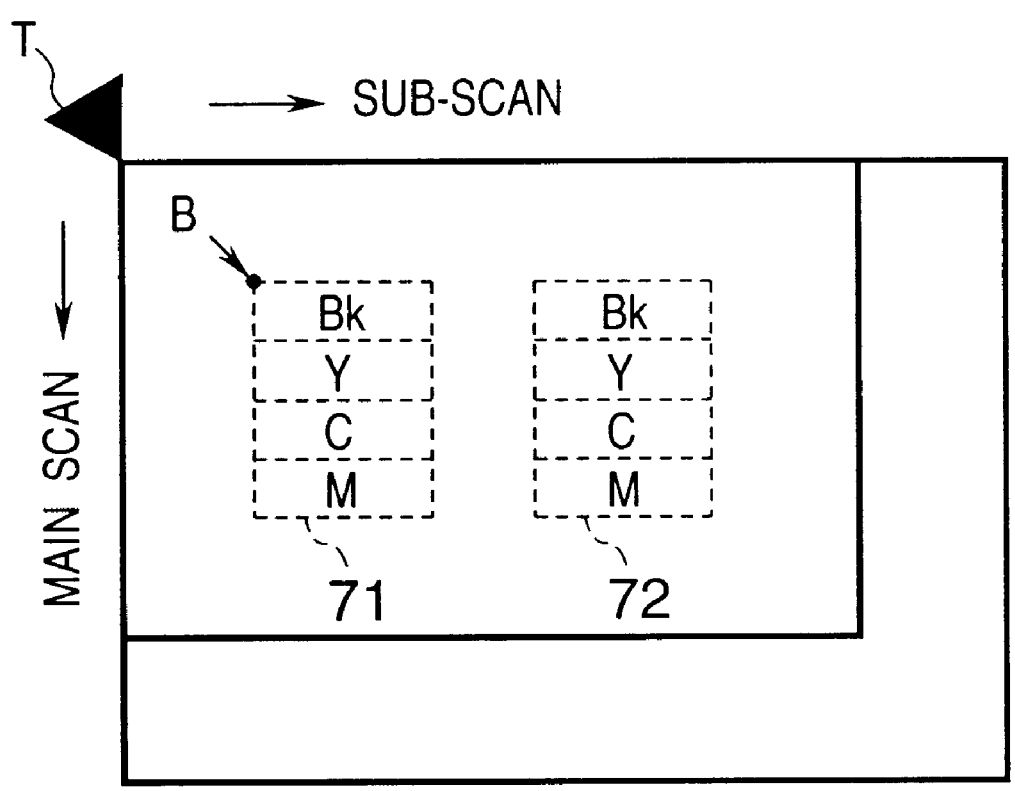
FIG. 14 shows the layout of test print 1 placed on the platen.

FIG. 14 is a top view of the printout of test print 2 placed on the platen glass 102. An upper left wedge-shaped mark T is an original registration mark, and a message (FIG. 10C) is displayed on the control panel to locate a Bk pattern on the side of the registration mark T and to prevent the wrong side from facing down. In this manner, control errors resulting from wrong document positions can be prevented.

Upon reading the patterns by the reader portion A, a scan gradually starts from the registration mark T. When a first density gap point B is obtained, the relative coordinate positions of respective color patches are determined based on the coordinate point of the point B, thus reading the individual patches (S57).

Figure 18:
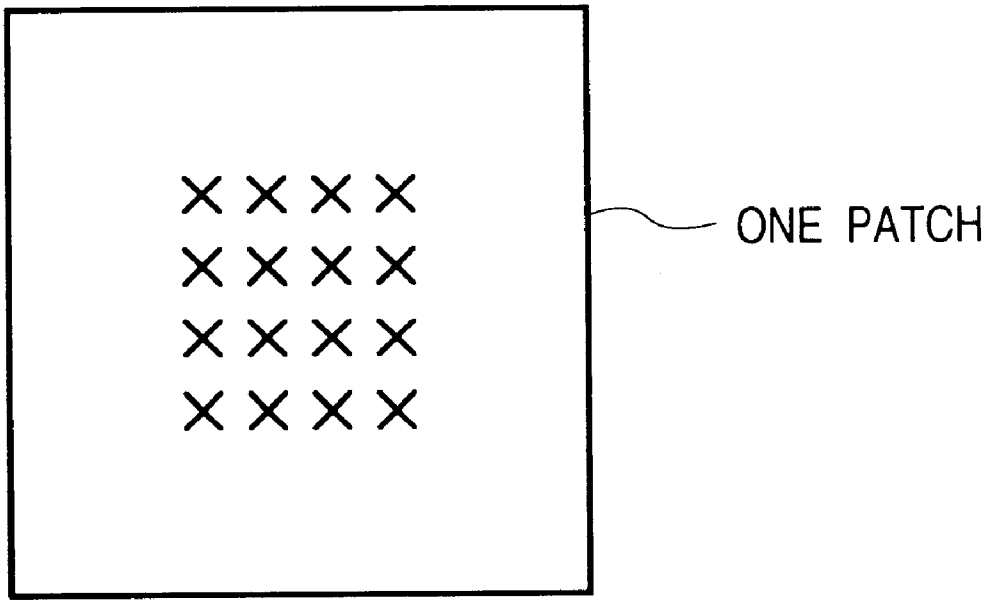
FIG. 18 shows reading points for the patch pattern of test print 2.

As shown in FIG. 18, 16 reading points (x) are set per patch (73 in FIG. 12), and the obtained signals are averaged. The number of points is preferably optimized depending on the reader and image processing apparatus.

{Generate and Set LUT 25: Step S58}

Figure 19:
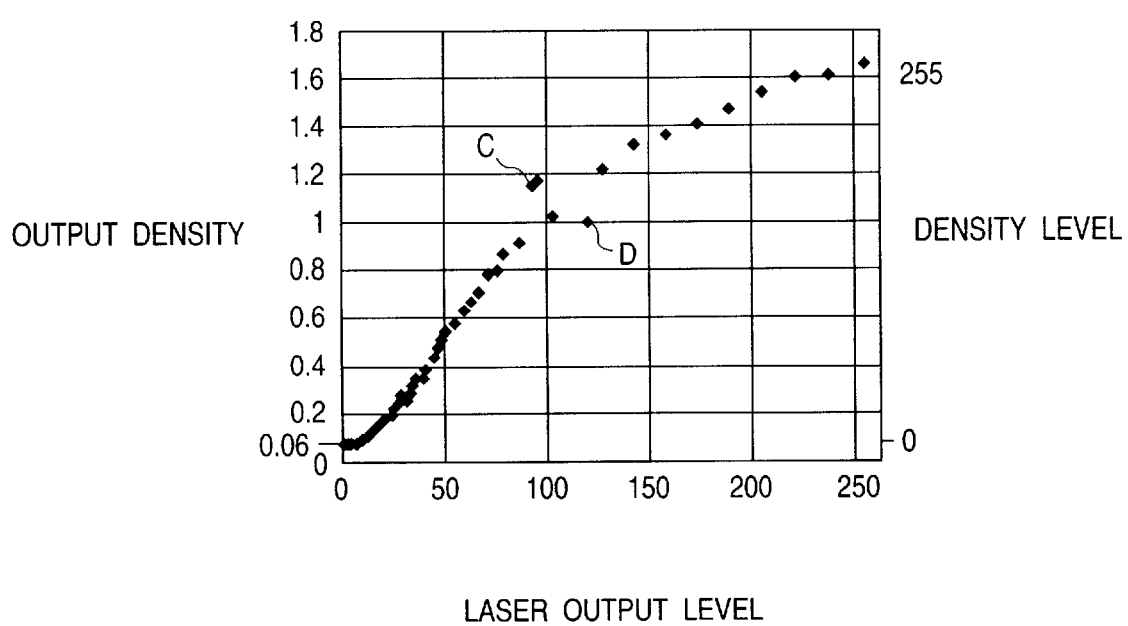
FIG. 19 is a graph showing a reading example of test print 2.

FIG. 19 plots, as the output density, density values, which are obtained by converting R, G, and B signals obtained by averaging the values at 16 points in units of patches into density values by the aforementioned conversion method into optical densities, along the left ordinate, and plots the laser output level along the abscissa.

Furthermore, as indicated by the right ordinate, the base density of a paper sheet (0.06 in this embodiment) is normalized to level 0, and the maximum density (1.60) of the image processing apparatus of this embodiment to level 255.

When obtained data indicates a peculiarly high density like point C or low density like point D, such data is highly likely to be obtained due to contamination on the platen glass 102 or errors on the test pattern. For this reason, to preserve continuity of a data sequence, the slope of the curve is corrected by a limiter. More specifically, when the slope assumes 3 or more, it is fixed at 3; when it assumes a minus value, the same density level as the previous level is set.

The contents of the LUT 25 can be easily generated by replacing the coordinate axes, i.e., the density level shown in FIG. 19 by the input level (the density signal axis in FIG. 6), and the laser output level by the output level (the laser output signal axis in FIG. 6), as described above. The values of density levels, which do not correspond to any patch are computed by interpolation.

At this time, a constraint condition is set so that zero output level is obtained in response to zero input level.

In step S58, the conversion contents generated by the aforementioned process are set in the LUT 25.

Figure 10D:
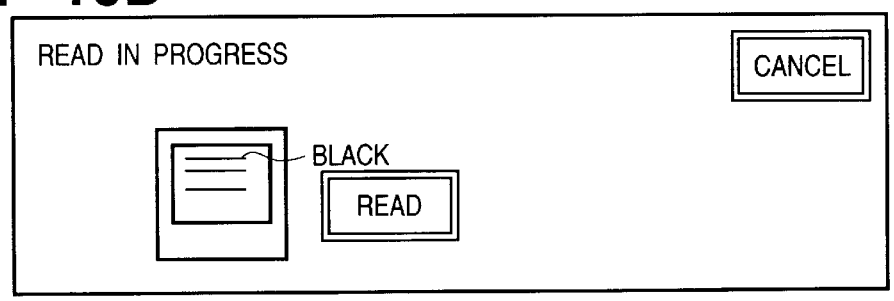
Figure 10E:
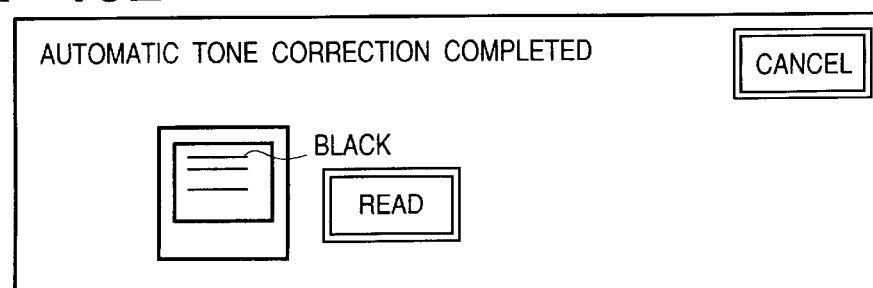

In this manner, the contrast potential control and generation of the γ conversion table by the first control system using the reader are completed. During the aforementioned processes, a message shown in FIG. 10D is displayed, and upon completion of the process, a message shown in FIG. 10E is displayed.

The control of the first control system has been explained. In this tone control, since the laser output is controlled so that an input image signal can correspond to a finally recorded image on a paper sheet as a transfer medium, very accurate control can be realized, and an output image with high tone accuracy can be obtained. However, since the transfer medium must be read, such control cannot be done so frequently. Hence, a second control system to be described below is executed a plurality of number of times between the execution timings of the first control system so as to stabilize image reproduction characteristics over a long period of time.

(Second Control System for Long-term Stabilization)

The second control system, which is executed to stabilize image reproduction characteristics obtained by the first control system over a long period of time, will be explained below.

Figure 21:
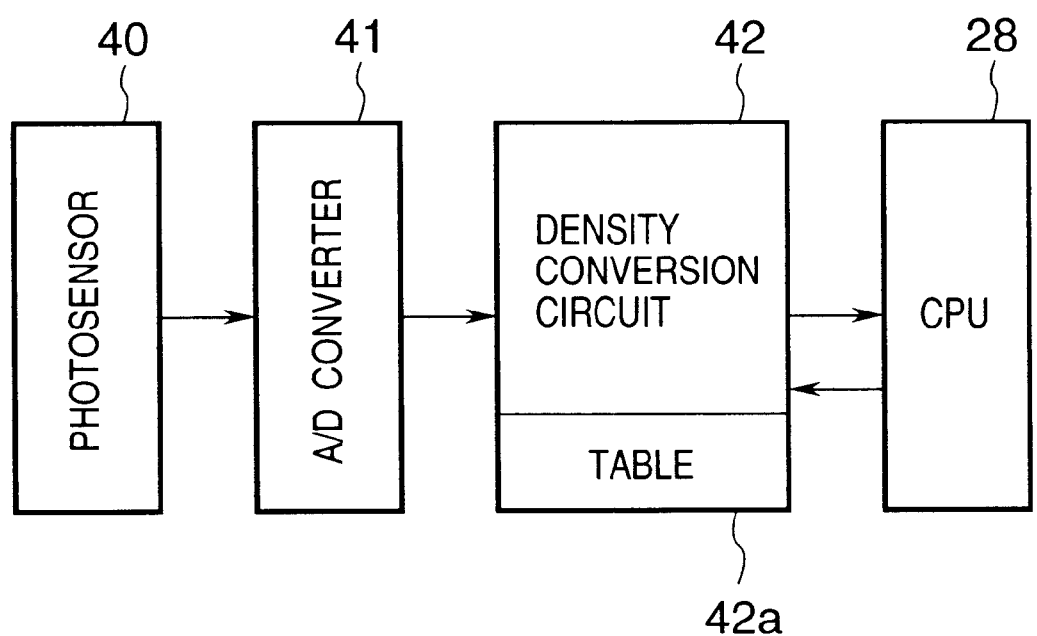
FIG. 21 is a block diagram from a photosensor 40 to density conversion.

FIG. 21 shows a processing circuit for processing a signal from the photosensor 40, which comprises the LED 10 and photodiode 11 that oppose the photosensitive drum 4. Near infrared light, which is reflected by the photosensitive drum 4 and enters the photosensor 40, is converted thereby into an electrical signal, which is converted from an output voltage ranging from 0 to 5 V into a digital signal ranging from levels 0 to 255 by an A/D converter 41. The digital signal is converted into a density value by the density conversion circuit 42.

Note that the toners used in this embodiment are yellow, magenta, and cyan color toners, and are formed by dispersing respective color agents using a styrene-based copolymer resin as a binder.

Figure 22:
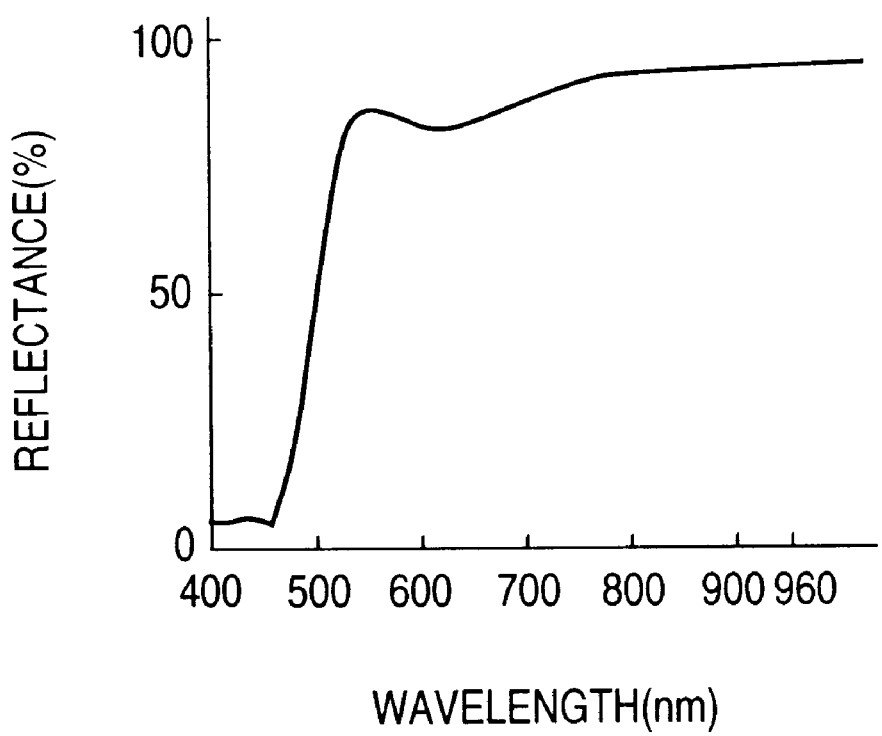
FIG. 22 is a graph showing the spectral characteristics of yellow toner.
Figure 23:
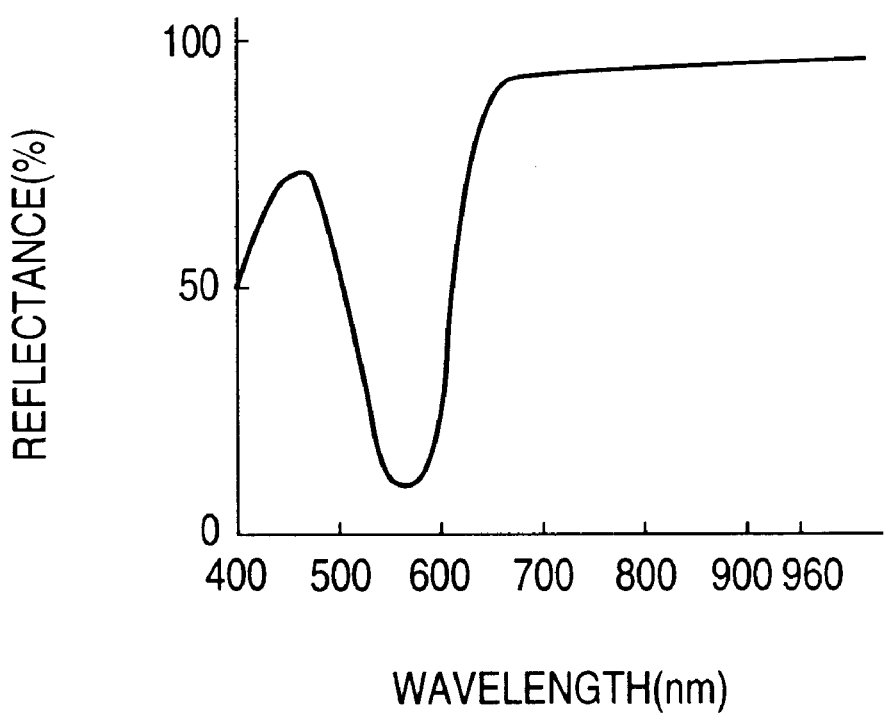
FIG. 23 is a graph showing the spectral characteristics of magenta toner.
Figure 24:
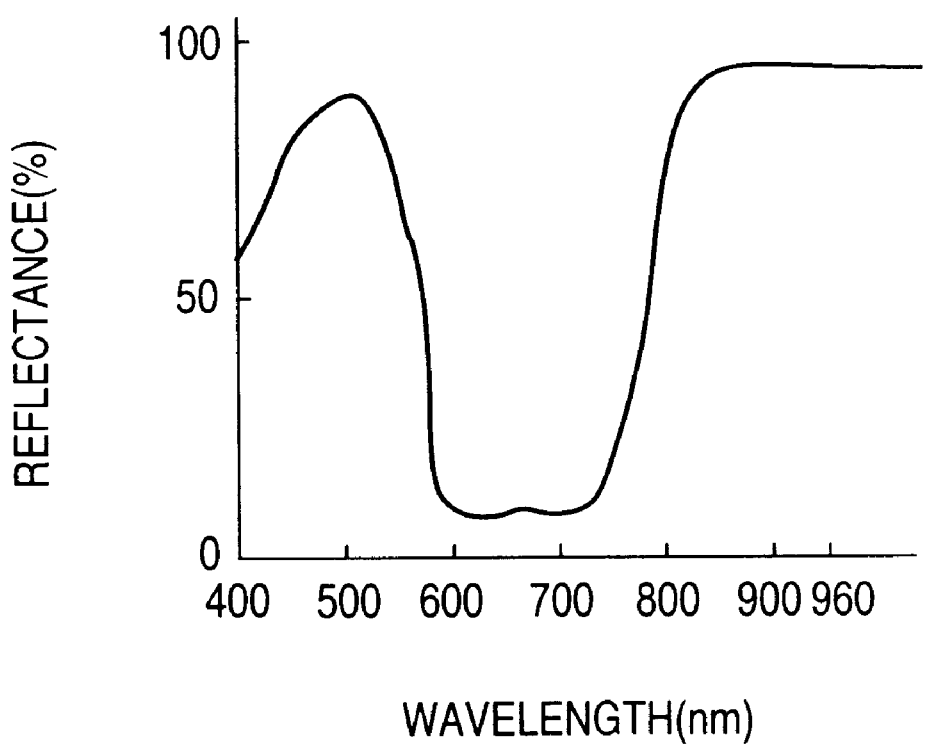
FIG. 24 is a graph showing the spectral characteristics of cyan toner.

The spectral characteristics of yellow, magenta, and cyan toners have 80% or higher reflectance of near infrared light (960 nm), as shown in FIGS. 22 to 24 in the order listed. Upon forming these color toner images, the two-component developing method advantageous in color purity and transmittance is used.

Figure 25:
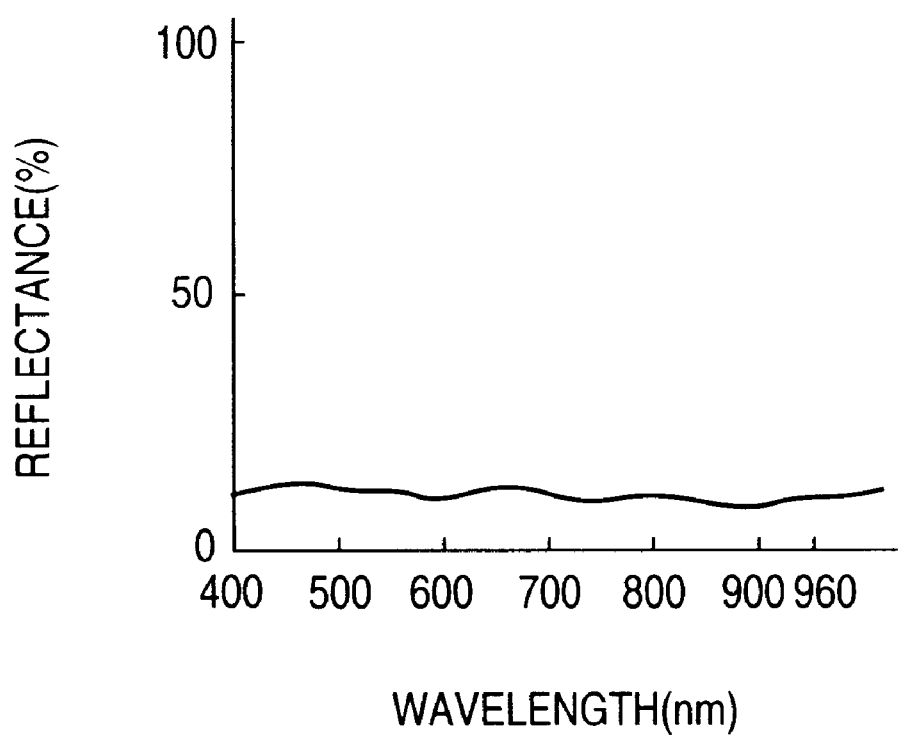
FIG. 25 is a graph showing the spectral characteristics of black toner.

On the other hand, in this embodiment, black toner has around 10% reflectance of near infrared light (960 nm), as shown in FIG. 25, since carbon black is used as a color agent to obtain pure black, although the identical two-component developing method is used.

The photosensitive drum 4 is an OPC drum which has around 40% reflectance of near infrared light, and an amorphous silicon-based drum or the like may be used if its reflectance is same as that of the OPC drum.

Figure 26:
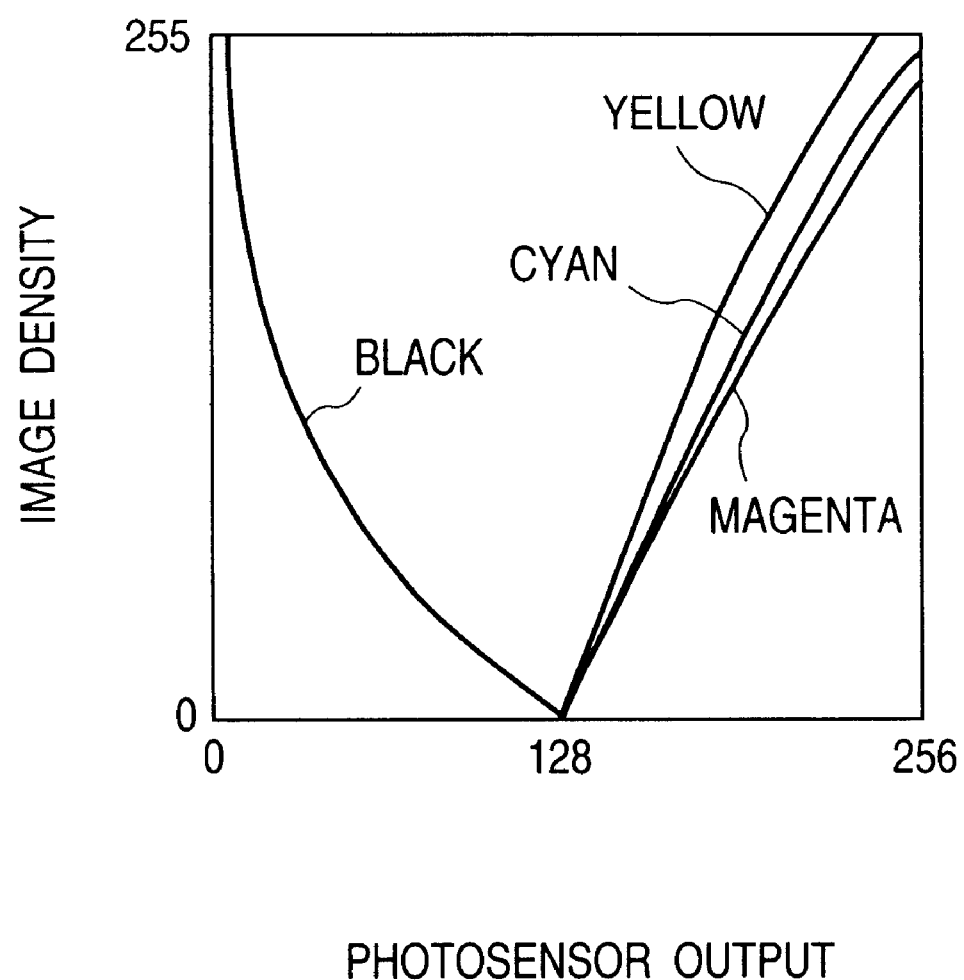
FIG. 26 is a graph showing the relationship between the photosensor output and image density.

FIG. 26 shows the relationship between the output from the photosensor 40 and the output image density when the density on the photosensitive drum 4 is changed stepwise by dot area modulation.

Assume that the output from the sensor 9 while no toner becomes attached to the photosensitive drum 4 is set at 2.5 V, i.e., level 128.

As can be seen from FIG. 26, the output from the photosensor 40 increases with increasing area coverage and image density of yellow, magenta, and cyan color toners.

On the other hand, the output from the photosensor 40 decreases with increasing area coverage and image density of black toner.

By preparing a table for converting sensor output signals dedicated to the individual colors into toner image densities on the photosensitive drum using the aforementioned characteristics, the toner image densities of the individual colors can be obtained with high precision. Since a change in toner image density corresponds to the final image density on a paper sheet, the second control system estimates a change in characteristics of the apparatus from a change in toner image density upon inputting identical image signals, and corrects the characteristics so that the output image density linearly corresponds to the image signal.

Figure 27A:
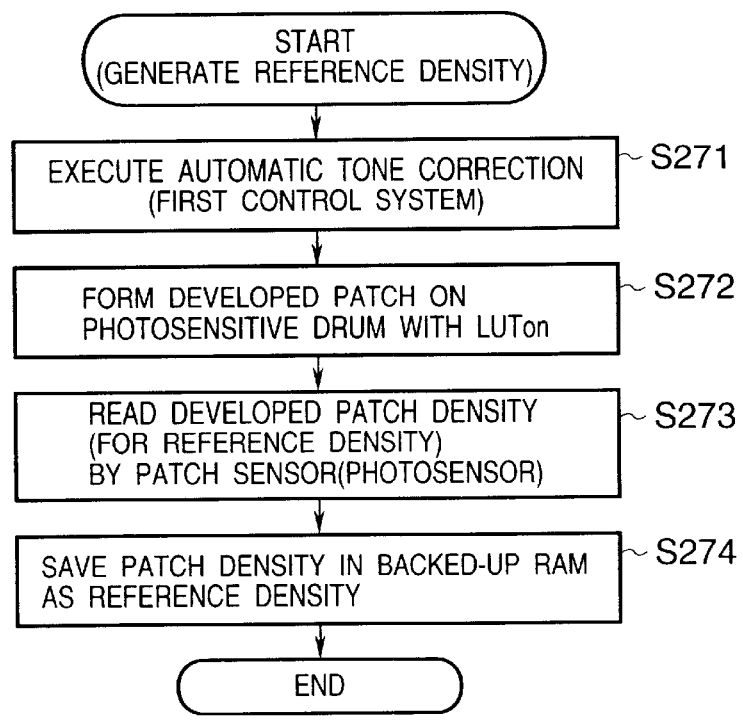
FIGS. 27A and 27B are flow charts of a second control system of the image processing apparatus according to the present invention.

FIG. 27A is a flow chart showing the second control for setting a reference density value. This control is implemented by the CPU 28.

After confirming that the LUT of the first control (automatic tone correction) is set (S271), developed patches obtained by forming and developing patch patterns in units of colors (Y, M, C, Bk) on the photosensitive drum (S272) are detected by the photosensor 40 (S273).

Note that the laser output of each color patch uses a density signal (image signal) of level 96.

Figure 28:
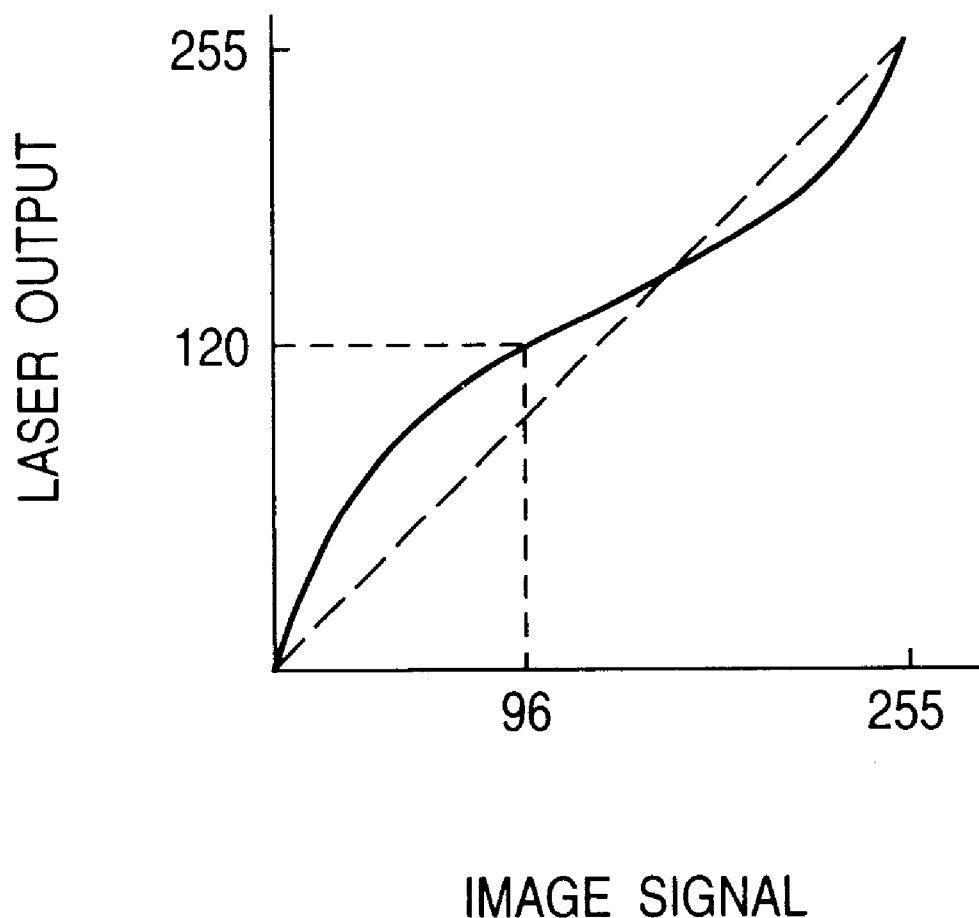
FIG. 28 is a graph showing the laser output upon forming a patch.

Hence, the output signal is determined based on the LUT 25 generated by the first control. For example, in case of the LUT made by using a graph shown in FIG. 28, a laser output signal of level 120 is obtained in response to an input signal of level 96. Since LUT are set in units of colors, the laser output signals are set in units of colors.

The laser output signals are fixed until the LUT are updated by the first control, but are not output values based on LUT determined by correction control (to be described later).

Figure 29:
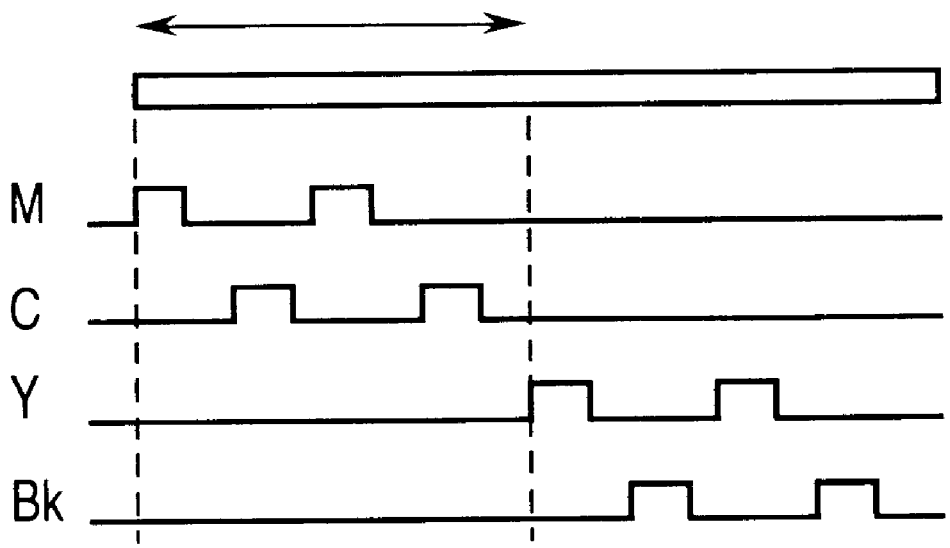
FIG. 29 is a chart showing the patch formation sequence of the second control system.

The sequence for forming patches on the photosensitive drum 4 is executed as shown in FIG. 29.

In this embodiment, in order to efficiently obtain accurate density data within a short period of time, identical color patches are formed and measured at 180° opposing angular positions on the photosensitive drum to compensate for any decentering of the photosensitive drum, are sampled a plurality of number of times, and the sampling results are averaged.

By forming patches of another color to sandwich those patches, data for two colors are obtained per round.

In this manner, data for four colors are obtained in two rounds, and density values are obtained using the density conversion table 42a shown in FIG. 21. FIG. 26 shows an example of a graph from which this density conversion table 42a is made.

The density value obtained by this density conversion table cannot be used as absolute density. This is because the photosensor does not have high resolution unlike the CCD used in the reader, and patches are not final images fixed on a paper sheet. However, a change amount in that density value can be deemed to correspond to that of the final image density. Hence, a density value obtained by the second control immediately after the first control, i.e., a toner density on the photosensitive drum obtained upon inputting an image signal of level 96 is determined to be a reference density value, a change in tone density value on the photosensitive drum from the reference density value upon executing the second control at a predetermined timing is checked, and a correction table is generated based on that change amount. Then, the generated correction table is combined with the LUT 25 obtained by the first control, and γ correction is made using the combined table.

In other words, since the first control guarantees an output density corresponding to an image signal in the LUT 25 immediately after that control, patches are formed using the laser output based on the LUT 25 immediately after the first control, the density values of those patches are stored, and the sensor is calibrated for any degradation of the photosensitive drum or the like using the stored density values as guaranteed reference density values. That is, a change in density value of each patch is checked using the stored value as the reference value, and the LUT 25 is corrected so that the patch density matches the reference value. In this manner, by executing the second control for making correction with reference to the LUT 25 at a predetermined timing, a change in image density characteristics over long-term use can be accurately coped with.

Such control will be described in more detail below.

As described above, the second control for acquiring a reference density is executed immediately after the first control so as to obtain a reference density value. Then, the LUT obtained by the first control is corrected on the basis of the difference between the reference density value, and the density value detected by the second control for correction, which is executed at a later, at the desired time.

Figure 27B:
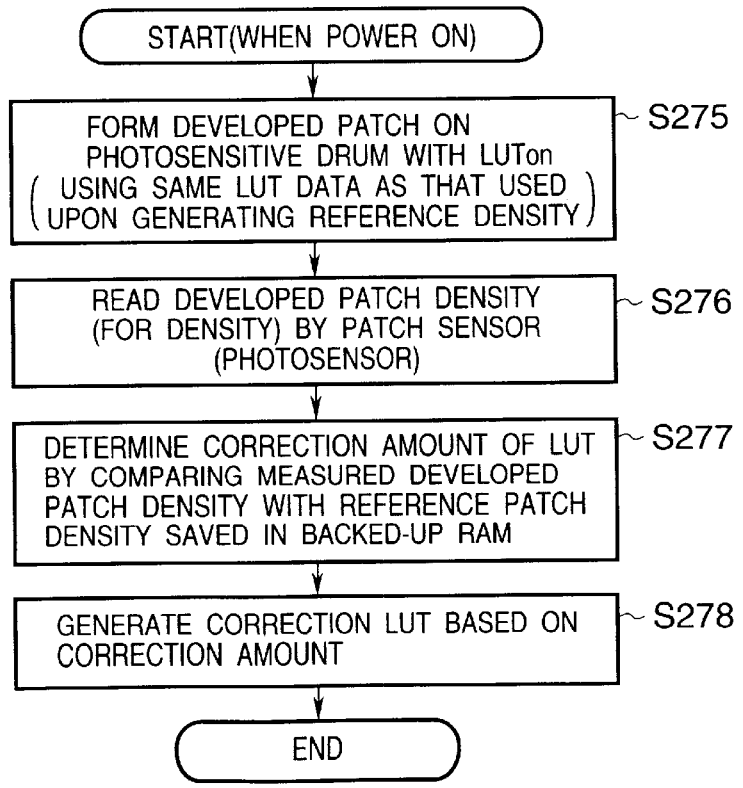

In the image processing apparatus of this embodiment, the second control for correction is executed when the main switch of the image processing apparatus is turned on, or a predetermined period of time after the main switch is turned on, or in accordance with the outputs from temperature and humidity sensors (not shown) for detecting environmental variations (FIG. 27B).

The sequence and output signal of this control are the same as those in the conditions upon acquiring the reference density.

When the main switch is turned on, developed patches are formed on the photosensitive drum using the LUT 25 obtained by the first control system as in step S272 above (S275). In this case, respective color patches are formed using laser outputs (obtained using the LUT 25) corresponding to an image signal of level 96.

Then, the developed patch densities are read by a patch sensor (photosensor) (S276). The measured patch densities are compared with the reference patch density to compute their differences.

Figure 30:
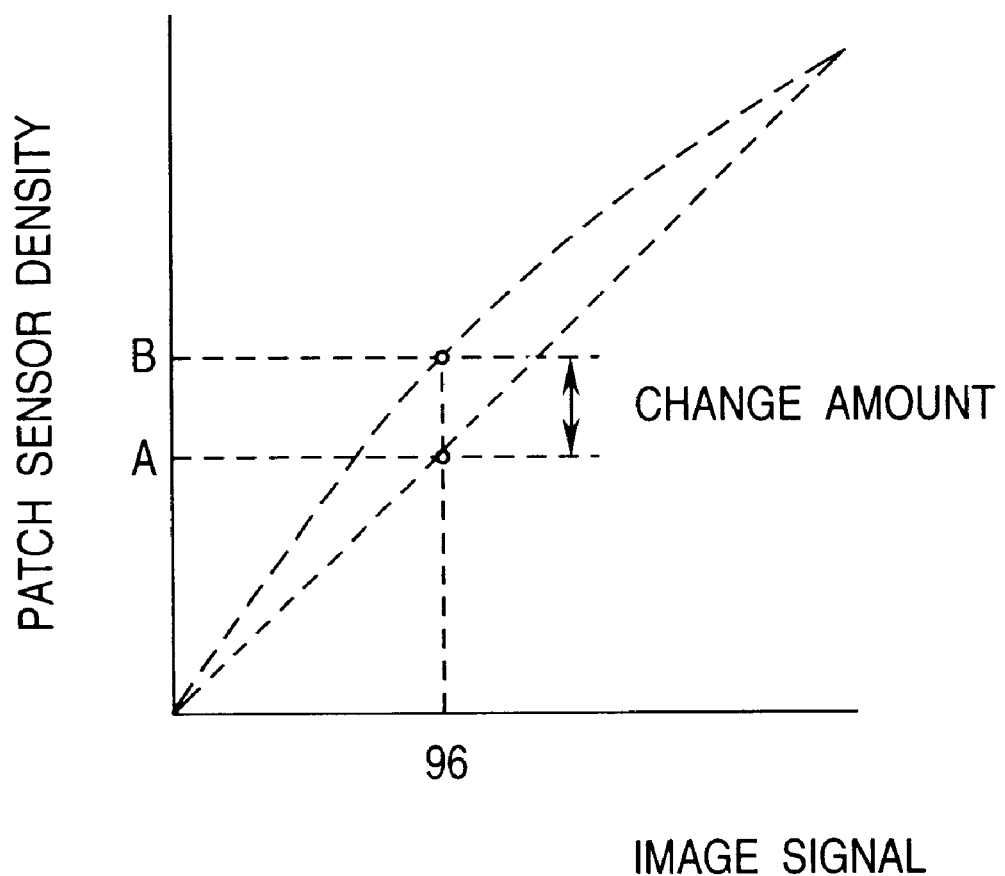
FIG. 30 is a graph showing a change in density detected by a photosensor when identical image signals are input to form patches.

FIG. 30 is a graph for explaining a change amount of the density detected by the photosensor when patches are formed based on identical input image signals.

More specifically, in FIG. 30, when the reference density value is at position A, and a correction density detected when the main switch is turned on is B, the difference between the density values plotted along the ordinate corresponds to a change amount from the reference density.

Figure 31:
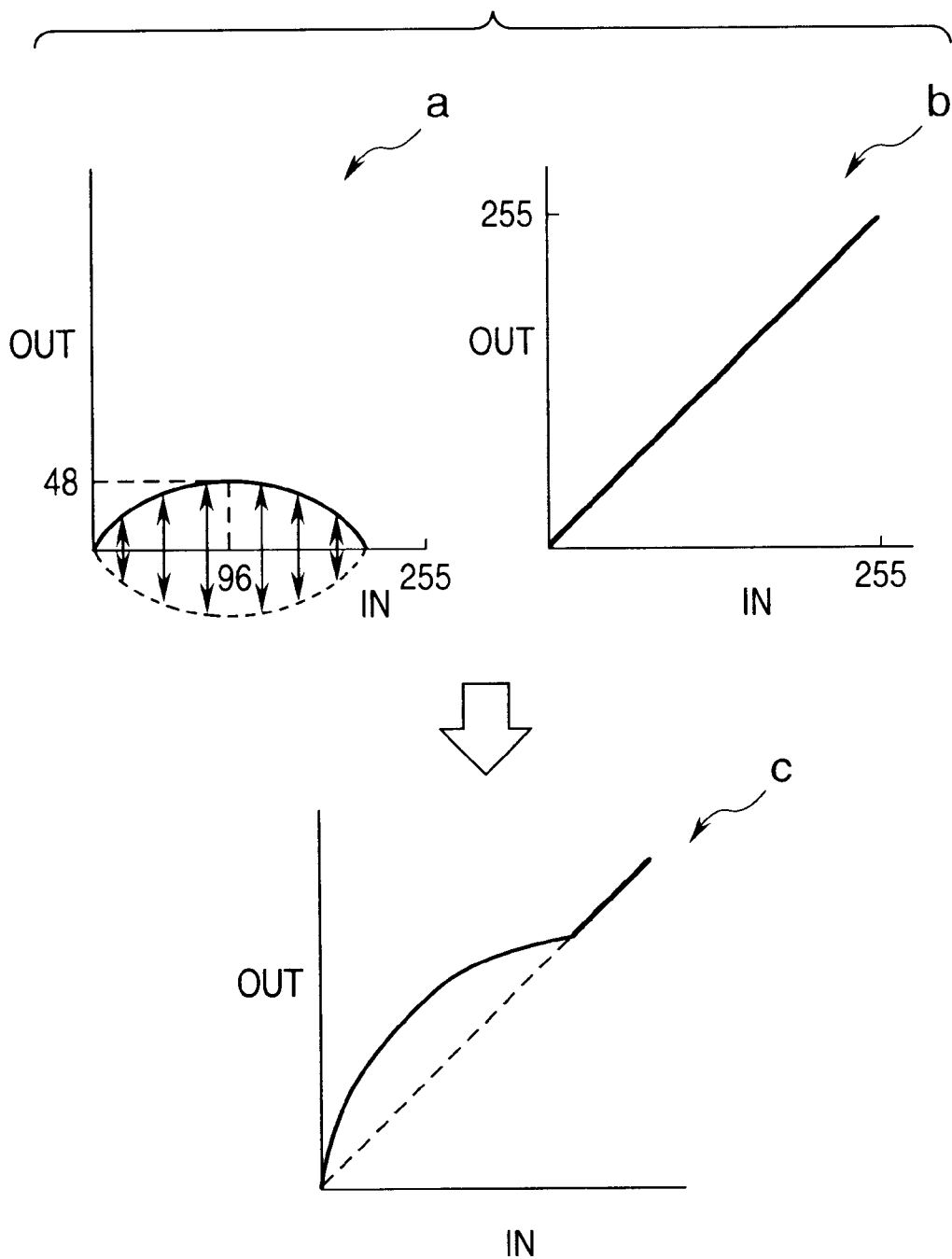
FIG. 31 shows graphs used for making correction tables.

Referring to FIG. 31, a graph a has correction characteristics which consider basic characteristics of the image processing apparatus of this embodiment, and change in the direction of an arrow in correspondence with the density change amount. In this embodiment, the correction characteristics have a peak at an image signal of level 96, and the output signal at that time is set at level 48. A correction value (0 to 48: ordinate) corresponding to an input image signal (abscissa) is obtained using the graph a, and the actual correction amount of an image signal (input signal) is obtained by computing:

(correction value (0 to 48))×[−density change amount)/correction characteristic peak value (48)]

The above formula is computed for all 256 levels of image signals, and the computation results are added to a linear graph b (input signal=output signal), thus preparing a graph c.

For example, when the input image signal has level 48 and the density change amount is "10", a value along the ordinate when the value along the abscissa of the graph a is "48" is read. Assuming that the read value is "40", it is substituted in the above formula to obtain 40×−10/48=−8.3.

Hence, the value in graph c is 48−8.3=39.7=about 40. A correction table which generates an output "40" in response to an input "48" is combined with the LUT 25 to prepare a single table. The correction table can be arbitrary set depending on the specifications of the apparatus.

Figure 32:
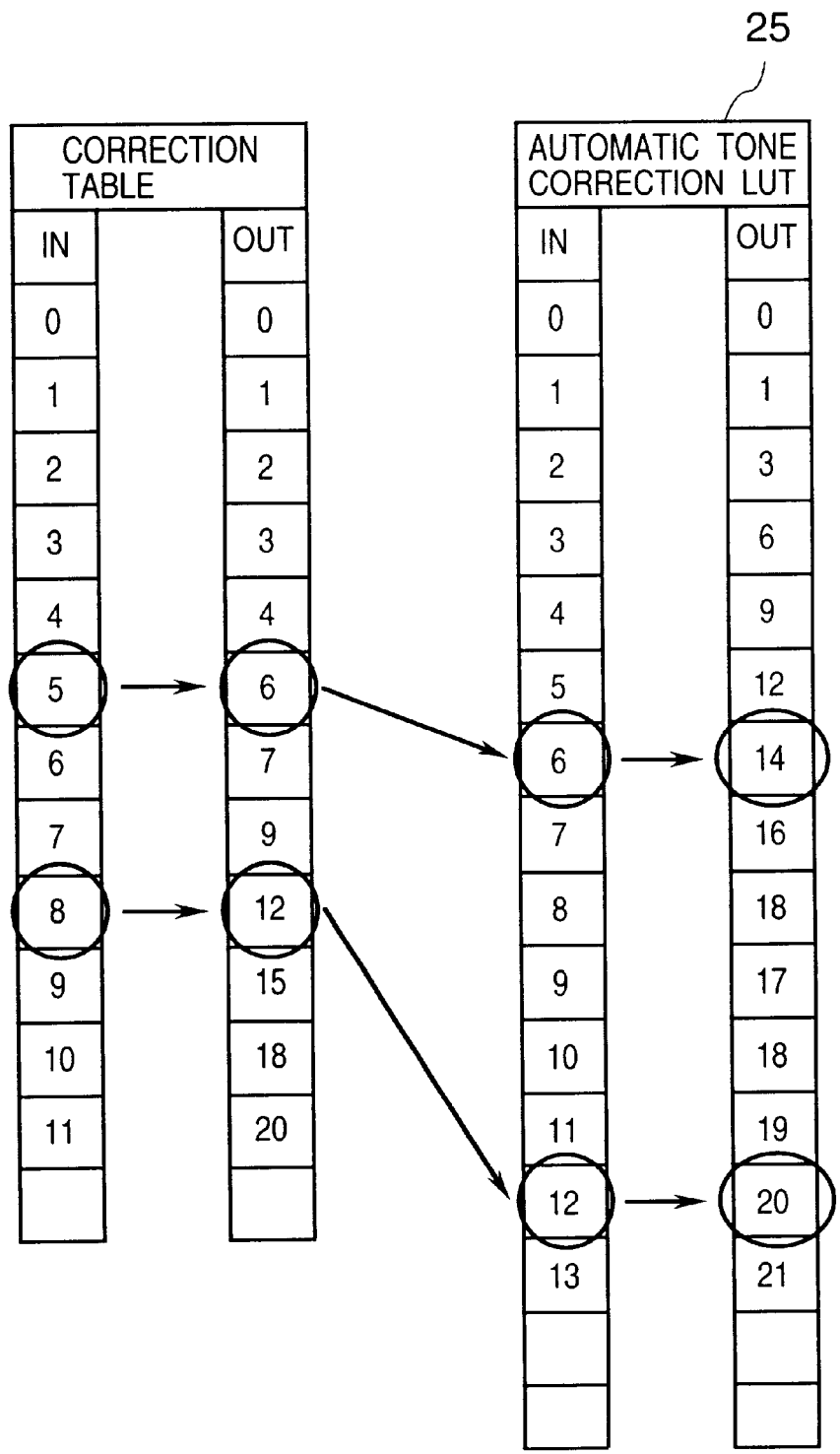
FIG. 32 is a view showing how to look up a correction table.

As shown in FIG. 32, a new table that makes the output data (OUT) of the LUT 25 generated by the first control correspond to the input address (IN) of the correction table replaces the LUT 25 generated by the first control, and an image is formed in practice. That is, in case of the correction table and LUT 25 shown in FIG. 32, according to the new table, an output of level 14 is obtained in response to an input of level 5, and an output of level 20 in response to an input of level 8.

The LUT 25 generated by the first control is saved in another storage area, and every time the second control for correction is repeated to generate the correction table, the LUT 25 is read out and is combined with the correction table, thus maintaining the initial characteristics.

Normally, the main switch of this image processing apparatus is kept off during the night, and is turned on in the morning. Hence, the second control system is normally initiated once per day.

By contrast, the first control system cannot be frequently executed since it requires manual operations.

Thus, upon installing the image processing apparatus, a service person executes the first control system and if no problem is found in an image, the second control system automatically maintains the characteristics, at that time, for a short term. When the characteristics have gradually changed over a long term, the first control system executes calibration. In this manner, the roles of the two control systems can be distributed, and as a consequence, given tone characteristics can be maintained until the service life of the image processing apparatus expires.

Automatic tone correction as the first control means is executed, and a developed patch is read and is set to be a reference density of a patch sensor as the second control for acquiring a reference density on the basis of the LUT generated by the first control.

Then, the LUT generated by the automatic tone correction is corrected in accordance with the change amount between the reference density and a patch density value of the second control for correction executed after the second control for acquiring the reference density, thus maintaining the image density characteristics obtained by the automatic tone correction for a long period of time. Not only upon installing said image processing apparatus but also upon servicing it, a service person can execute the first control system. Further, by the user's operation, the first control system may be executed.

In this embodiment, the correction characteristics shown in graph a in FIG. 31 are set at values that can cope with both plus and minus density change amounts. Alternatively, independent correction characteristics respectively corresponding to the plus and minus sides can be used to optimize the control.

Furthermore, a plurality of correction characteristics may be prepared, and an optimal correction LUT may be selected in correspondence with the change amount, thus obtaining the same effect as above.

In this embodiment, an image is formed by a laser beam. Also, the present invention can be applied to an image forming apparatus using an exposure device such as an LED other than the laser.

In this embodiment, a reflection sensor is used. If the photosensitive drum is made of a material with high transparency, a transmission sensor may be used.

[Second Embodiment]

This embodiment will exemplify an image processing apparatus using an intermediate transfer medium. The second control in this embodiment provides a photosensor above the intermediate transfer medium to detect the developed patch density.

Figure 33:
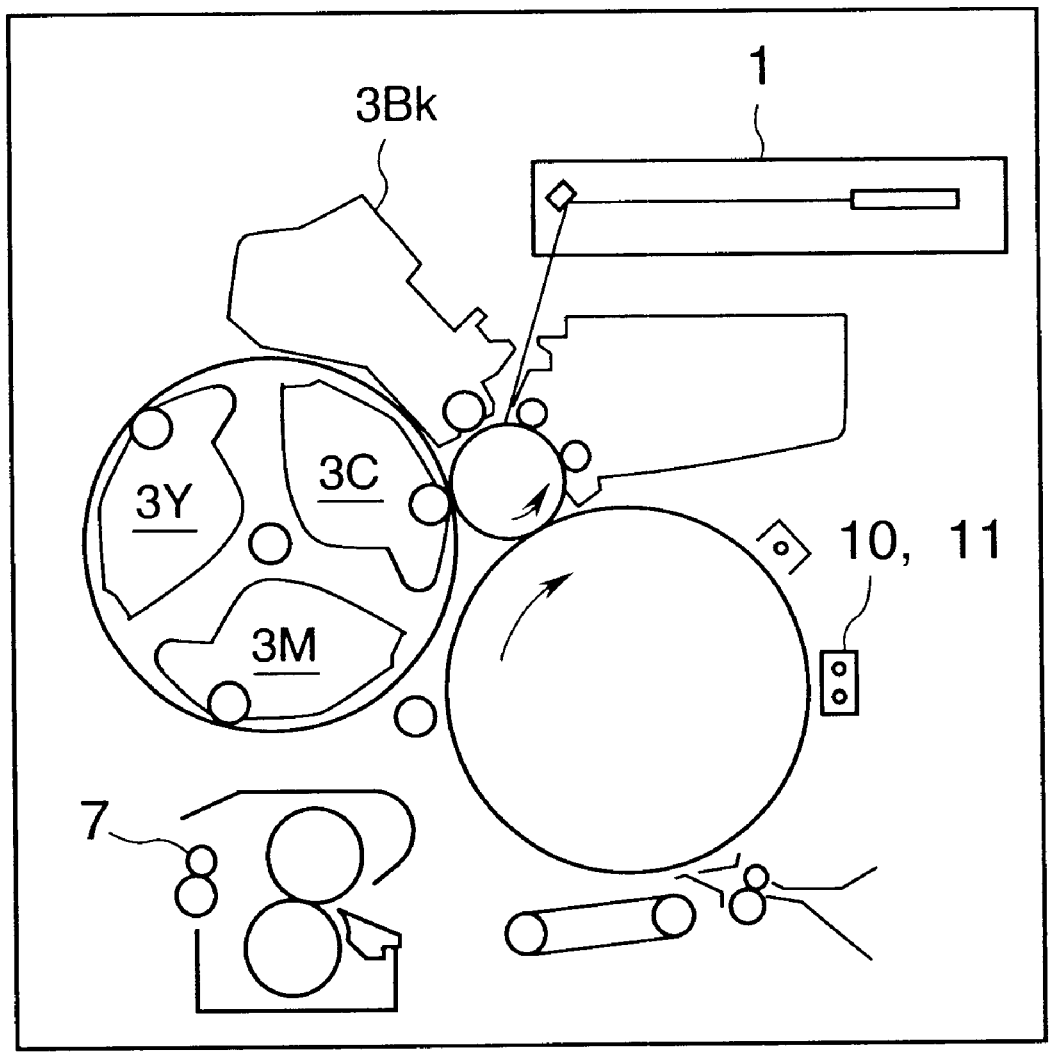
FIG. 33 is a schematic view showing the arrangement of an image processing apparatus according to the second embodiment of the present invention.

FIG. 33 shows a printer portion of the image processing apparatus of this embodiment. A rotary developer is used, and yellow, magenta, and cyan developing cartridges 3Y, 3M, 3C are housed in a rotary. Each developing cartridge moves to the developing position to develop a latent image at a desired timing. A black cartridge 3Bk is fixed in position, and the time required for rotating the rotary developer can be reduced when an image is printed using only black.

A toner image formed on the photosensitive drum 4 in accordance with each color image information is transferred in turn onto the intermediate transfer medium 331. In case of a full-color image, after four-color tone images are transferred onto the intermediate transfer medium, they are simultaneously transferred onto a recording medium fed from a paper feed unit. The recording medium is exhausted outside the apparatus via a fixing process by a fixing device, thus obtaining a full-color print.

The charger for the photosensitive drum in the image processing apparatus of this embodiment uses a contact charging method. The applied voltages are an AC bias (constant current) for obtaining uniform charging, and a DC bias (constant voltage) for determining a charging potential. As is known, the contact charging method in which AC bias+DC bias are superposed considerably deteriorates the photosensitive drum, and especially shaves the surface layer. When a corona charger in the first embodiment is used, the shaving amount is around 1 $\mu$m after 100,000 rotations, while the contact charging method in which AC bias+DC bias are superposed in this embodiment shaves around 12 $\mu$m after 100,000 rotations.

Therefore, it is not preferable to form patches on the photosensitive drum in terms of long-term stabilization since variation factors upon reading patches increase.

On the other hand, the intermediate transfer medium suffers less deterioration factors compared to the photosensitive drum, and the tone characteristics can be more stabilized.

Hence, the sensor for the second control of the image processing apparatus of this embodiment is provided above the intermediate transfer medium.

In this embodiment as well, automatic tone correction as the first control means is executed, patches are formed on the intermediate transfer medium on the basis of the LUT generated by the first control, and developed patched are read as the second control for acquiring a reference density. Then, the LUT generated by the automatic tone correction is corrected in correspondence with the change amount between the obtained reference density of the patch sensor, and the patch density value of the second control for correction executed after that for acquiring the reference density, thus maintaining the image density characteristics obtained by the automatic tone correction for a long period of time.

In this embodiment, shaving of the photosensitive drum is exemplified as its change factor, but the present invention can be applied to various other change factors such as deterioration due to a discharge product, scratches formed in the cleaning process, and the like.

In this embodiment, patches are read on the intermediate transfer medium. Also, the present invention can be applied if an arrangement for reading developed patches is provided to another portion, e.g., a transfer belt for conveying a recording medium, or the like.

In this embodiment, a reflection sensor is used. If the intermediate transfer medium, transfer belt, or the like is made of a material with high transparency, a transmission sensor may be used.

In this embodiment, an image is formed by a laser beam. Also, the present invention can be applied to an image forming apparatus using an exposure device such as an LED other than the laser.

[Other Embodiments]

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

For example, when the present invention is applied to a printer, the LUT 25 may be generated using a scanner only when the first control system is executed.

The objects of the present invention are also achieved by supplying a storage medium, which records a program code of a software program that can implement the functions of the above mentioned embodiments to the system or apparatus, and reading out and executing the program code stored in the storage medium by a computer (or a CPU or MPU) of the system or apparatus. In this case, the program code itself read out from the storage medium implements the functions of the above mentioned embodiments, and the storage medium, which stores the program code constitutes the present invention. The functions of the above mentioned embodiments may be implemented not only by executing the readout program code by the computer but also by some or all of actual processing operations executed by an OS (operating system) running on the computer on the basis of an instruction of the program code.

Furthermore, the functions of the above mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the storage medium, the storage medium stores the program codes corresponding to the aforementioned flow charts (shown in FIG. 27A and/or FIG. 27B).

According to the present invention, an image processing apparatus which can stably maintain high precision image density characteristics for a long period of time, and its control method can be provided.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

forming means for forming a gray scale pattern on an image carrier, and forming a gray scale pattern image by transferring an image corresponding to the gray scale pattern onto a recording sheet;

determination means for reading the gray scale pattern image formed on the recording sheet, and determining density correction characteristics of said forming means at a first timing;

holding means for holding the density correction characteristics determined by said determination means;

storage means for storing a density of a predetermined image formed on the image carrier at the first timing; and adjustment means for adjusting the density correction characteristics held by said holding means in accordance with a relationship between the density stored in said storage means, and the density of the predetermined image formed on the image carrier at a second timing.

2. The apparatus according to claim 1, wherein holding of the density correction characteristics and storage in said storage means are done when said image processing apparatus is installed or serviced, or when operated by a user.

3. The apparatus according to claim 1, further comprising original reading means for reading an image on an original, and wherein said original reading means reads the gray scale pattern formed on the recording sheet.

4. The apparatus according to claim 1, further comprising a reflection sensor or a transmission sensor for reading an image on the image carrier.

5. The apparatus according to claim 1, wherein said holding means is an LUT, and said adjustment means adjusts the LUT corresponding to the density correction characteristics in accordance with the relationship.

6. The apparatus according to claim 1, wherein the image carrier is a photosensitive body.

7. The apparatus according to claim 1, wherein the image carrier is an intermediate transfer medium.

8. The apparatus according to claim 1, wherein the image carrier is a transfer belt.

9. The apparatus according to claim 1, wherein adjustment by said adjustment means is done when a main power supply of said image processing apparatus is turned on, when said image processing apparatus is installed, or every time a predetermined time elapses.

10. The apparatus according to claim 1, wherein adjustment by said adjustment means is done when a main power supply of said image processing apparatus is turned on, after a predetermined time elapses, or in accordance with an environmental change in temperature or humidity.

11. An image processing apparatus which forms an electrostatic latent image on an image carrier by an image exposure output corresponding to an image signal, develops the electrostatic latent image with toner, and transfers the developed toner image on the image carrier onto a recording medium, comprising:

pattern forming means for forming a gray scale pattern based on a predetermined image signal on the recording medium;

reading means for reading the gray scale pattern formed by said pattern forming means;

first control means for controlling the image exposure output corresponding to the image signal to match the tone of the image signal with the tone of an image recorded on the recording medium by comparing the gray scale pattern read by said reading means with the predetermined image signal;

storage means for storing a density value of a toner image formed on the image carrier by the image exposure output controlled by said first control means as a reference density value immediately after the control of said first control means;

detection means for detecting a density value of a toner image formed on the image carrier by the image exposure output controlled by said first control means; and second control means for controlling the image exposure output corresponding to the image signal to match the density value detected by said detection means with the reference density value stored in said storage means, wherein said first control means comprises:

first table generation means for generating a first table for storing a correspondence between the image signal and image exposure output; and table storage means for storing the first table, said second control means comprises:

correction table generation means for generating a correction table for correcting the image signal to match the density value detected by said detection means with the reference density value stored in said storage means; and second table generation means for generating a second table by combining the first table stored in said table storage means with the correction table, and an image is formed using the second table.

12. The apparatus according to claim 11, wherein detection by said detection means and control by said second control means are automatically done at a predetermined timing.

13. A method of controlling an image processing apparatus, comprising:

a forming step of forming a gray scale pattern on an image carrier, and forming a gray scale pattern image by transferring an image corresponding to the gray scale pattern onto a recording sheet;

a determination step of reading the gray scale pattern image formed on the recording sheet, and determining density correction characteristics of said forming step, at a first timing;

a holding step of holding the density correction characteristics determined in the determination step;

a storage step of storing a density of a predetermined image formed on the image carrier at the first timing; and an adjustment step of forming the predetermined image on the image carrier at a second timing, and adjusting the density correction characteristics held in said holding step in accordance with a relationship between the density stored in the storage step, and the density of the predetermined image formed on the image carrier at the second timing.

14. The method according to claim 13, wherein holding of the density correction characteristics and storage in the storage step are done when said image processing apparatus is installed or serviced, or when operated by a user.

15. The method according to claim 13, further comprising a reading step of reading the gray scale pattern formed on the recording sheet.

16. The method according to claim 13, wherein adjustment in the adjustment step is done when a main power supply of the image processing apparatus is turned on, when the image processing apparatus is installed, or every time a predetermined time elapses.

17. The method according to claim 13, wherein adjustment in the adjustment step is done when a main power supply of the image processing apparatus is turned on, after a predetermined time elapses, or in accordance with an environmental change in temperature or humidity.

18. A method of controlling an image processing apparatus which forms an electrostatic latent image on an image carrier by an image exposure output corresponding to an image signal, develops the electrostatic latent image with toner, and transfers the developed toner image on the image carrier onto a recording medium, comprising:

a first control step of controlling the image exposure output corresponding to the image signal to match the tone of the image signal with the tone of an image recorded on the recording medium by reading an image on the recording medium on which a predetermined image is recorded by the image processing apparatus;

a storage step of storing a density value of a toner image formed on the image carrier by the image exposure output controlled in the first control step as a reference density value immediately after the first control step;

a detection step of inputting the predetermined image signal at a predetermined timing and detecting a density value of a toner image formed on the image carrier at that time; and a second control step of controlling the image exposure output corresponding to the image signal to match the density value detected in the detection step with the reference density value stored in the storage step, wherein the first control step comprises:

a first table generation step of generating a first table for storing a correspondence between the image signal and image exposure output; and a table storage step of storing the first table, a second control step comprises:

a correction table generation step of generating a correction table for correcting the image signal to match the density value detected in the detection step with the reference density value stored in the storage step; and a second table generation step of generating a second table by combining the first table stored in the table storage step with the correction table, and said method further comprises an image forming step of forming an image using the second table.

19. The method according to claim 18, wherein the detection step and the second control step are automatically executed at a predetermined timing.

20. A computer readable memory which stores a control program for an image processing apparatus, which forms an electrostatic latent image on an image carrier by an image exposure output corresponding to an image signal, develops the electrostatic latent image with toner, and transfers the developed toner image on the image carrier onto a recording medium, storing:

a forming program for forming a gray scale pattern on the image carrier, and forming a gray scale pattern image by transferring an image corresponding to the gray scale pattern onto the recoding sheet;

a determination program for reading the gray scale pattern image formed on the recording sheet, and determining density correction characteristics of the forming program at a first timing;

a holding program for holding the density correction characteristics determined by the determination program;

a storage program for storing a density of a predetermined image formed on the image carrier at the first timing; and an adjustment program for forming the predetermined image on the image carrier at a second timing adjusting the density correction characteristics held in the holding program in accordance with a relationship between the density stored in the storage program, and the density of the predetermined image formed on the image carrier at the second timing.

21. The memory according to claim 20, wherein said control program is programmed to execute holding of the density correction characteristics and storage in the storage program when said image processing apparatus is installed or serviced, or when operated by a user.

22. The memory according to claim 20, further storing a reading program for reading the gray scale pattern formed on the recording sheet.

23. The memory according to claim 20, wherein adjustment by the adjustment program is done when a main power supply of the image processing apparatus is turned on, when the image processing apparatus is installed, or every time a predetermined time elapses.

24. The memory according to claim 20, wherein adjustment by the adjustment program is done when a main power supply of the image processing apparatus is turned on, after a predetermined time elapses, or in accordance with an environmental change in temperature or humidity.

25. A computer readable memory which stores a control program for an image processing apparatus, which forms an electrostatic latent image on an image carrier by an image exposure output corresponding to an image signal, develops the electrostatic latent image with toner, and transfers the developed toner image on the image carrier onto a recording medium, storing:

a first control program for controlling the image exposure output corresponding to the image signal to match the tone of the image signal with the tone of an image recorded on the recording medium by reading an image on the recording medium on which a predetermined image is recorded by the image processing apparatus;

a storage program for storing a density value of a toner image formed on the image carrier by the image exposure output controlled by the first control program as a reference density value immediately after execution of the first control program;

a detection program for inputting the predetermined image signal at a predetermined timing and detecting a density value of a toner image formed on the image carrier at that time; and a second control program for controlling the image exposure output corresponding to the image signal to match the density value detected by the detection program with the reference density value stored in the storage program, wherein the first control program includes:

a first table generation program for generating a first table for storing a correspondence between the image signal and image exposure output; and a table storage program for storing the first table, the second control program includes:

a correction table generation program for generating a correction table for correcting the image signal to match the density value detected by the detection program with the reference density value stored in the storage program; and a second table generation program for generating a second table by combining the first table stored in the table storage program with the correction table.

26. The memory according to claim 25, wherein the detection program and the second control program are automatically executed at a predetermined timing.

27. An image processing apparatus comprising:

first calibrating means for calibration an image forming apparatus based on an image fixed on a recording medium and generating a look-up table for correcting image data; and second calibrating means for calibrating the image forming apparatus based on an image formed on an image holding medium and generating data for correcting the look-up table.

28. The apparatus according to claim 27, wherein said recording medium is a paper.

29. The apparatus according to claim 27, wherein said image forming apparatus is an electrophotographic printer.

30. The apparatus according to claim 27, wherein said image holding medium is a photosensitive drum.

31. The apparatus according to claim 27, wherein said image holding medium is an intermediate transfer medium.

32. An image processing method comprising:

a first calibrating step for calibration an image forming apparatus based on an image fixed on a recording medium and generating a look-up table for correcting image data; and a second calibrating step for calibrating the image forming apparatus based on an image formed on an image holding medium and generating data for correcting the look-up table.

33. A computer-readable memory which stores an image processing program comprising:

a code of a first calibrating program for calibration an image forming apparatus based on an image fixed on a recording medium and generating a look-up table for correcting image data; and a code of a second calibrating step for calibrating the image forming apparatus based on an image formed on an image holding medium and generating data for correcting the look-up table.

* * * * *